United States Patent
Shu et al.

(10) Patent No.: US 10,869,272 B2
(45) Date of Patent: Dec. 15, 2020

(54) COMMUNICATION METHOD AND APPARATUS APPLIED TO HYPER CELL

(71) Applicant: Huawei Technologies Co., Ltd., Shenzhen (CN)

(72) Inventors: Bing Shu, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 16/120,034

(22) Filed: Aug. 31, 2018

(65) Prior Publication Data
US 2018/0376422 A1 Dec. 27, 2018

Related U.S. Application Data

(63) Continuation of application No. PCT/CN2017/075411, filed on Mar. 2, 2017.

(30) Foreign Application Priority Data

Mar. 3, 2016 (CN) .......................... 2016 1 0122182

(51) Int. Cl.
*H04W 52/02* (2009.01)
*H04W 76/27* (2018.01)
(Continued)

(52) U.S. Cl.
CPC ... *H04W 52/0235* (2013.01); *H04W 72/1284* (2013.01); *H04W 72/1289* (2013.01);
(Continued)

(58) Field of Classification Search
CPC ......... H04W 52/0235; H04W 72/1289; H04W 72/1284; H04W 28/0278; H04W 76/27;
(Continued)

(56) References Cited

U.S. PATENT DOCUMENTS

| | | |
|---|---|---|
| 2010/0027456 A1 | 2/2010 | Onggosanusi et al. |
| 2011/0044177 A1 | 2/2011 | Nair et al. |

(Continued)

FOREIGN PATENT DOCUMENTS

| | | |
|---|---|---|
| CN | 101583193 A | 11/2009 |
| CN | 102158981 A | 8/2011 |

(Continued)

*Primary Examiner* — Jackie Zuniga Abad
(74) *Attorney, Agent, or Firm* — Slater Matsil, LLP

(57) ABSTRACT

A method includes determining, by a mobile device in a power saving state that is in a hyper cell, that there is to-be-sent uplink data, where the hyper cell comprises a plurality of transmission points (TPs), the hyper cell identifies the mobile device using a dedicated user equipment identity (DUI), and the mobile device in the power saving state reserves the DUI; sending, by the mobile device, an uplink instruction message to a radio access network controller or a core network controller based on the DUI by using a preconfigured uplink resource, wherein the uplink instruction message is used to instruct the mobile device to enter an activated state; and sending, by the mobile device in the activated state, the uplink data to the controller.

16 Claims, 12 Drawing Sheets

(51) Int. Cl.
*H04W 72/12* (2009.01)
*H04W 16/32* (2009.01)
*H04W 28/02* (2009.01)
*H04W 74/08* (2009.01)
*H04W 88/02* (2009.01)

(52) U.S. Cl.
CPC ............ *H04W 76/27* (2018.02); *H04W 16/32* (2013.01); *H04W 28/0278* (2013.01); *H04W 74/0833* (2013.01); *H04W 88/02* (2013.01); *Y02D 30/70* (2020.08)

(58) Field of Classification Search
CPC . H04W 88/02; H04W 74/0833; H04W 16/32; H04W 74/004
See application file for complete search history.

(56) References Cited

U.S. PATENT DOCUMENTS

| | | | |
|---|---|---|---|
| 2013/0343312 A1* | 12/2013 | Lv | H04L 1/1607 370/329 |
| 2014/0192767 A1 | 7/2014 | Au et al. | |
| 2015/0003263 A1* | 1/2015 | Senarath | H04L 5/0007 370/252 |
| 2016/0007406 A1 | 1/2016 | Yi et al. | |
| 2016/0029250 A1 | 1/2016 | Yi et al. | |
| 2017/0064546 A1* | 3/2017 | Baligh | H04W 12/0609 |
| 2018/0376422 A1 | 12/2018 | Shu et al. | |

FOREIGN PATENT DOCUMENTS

| | | |
|---|---|---|
| CN | 102781109 A | 11/2012 |
| CN | 103428786 A | 12/2013 |
| CN | 104735680 A | 6/2015 |
| CN | 104838713 A | 8/2015 |
| CN | 104853442 A | 8/2015 |
| CN | 105052192 A | 11/2015 |
| CN | 107155221 A | 9/2017 |
| CN | 108370398 A | 8/2018 |
| EP | 2699034 B1 | 7/2019 |
| WO | 2017098442 A1 | 6/2017 |
| WO | 2017140275 A1 | 8/2017 |

* cited by examiner

COMMUNICATION METHOD AND APPARATUS APPLIED TO HYPER CELL

CROSS-REFERENCE TO RELATED APPLICATIONS

This application is a continuation of International Application No. PCT/CN2017/075411, filed on Mar. 2, 2017, which claims priority to Chinese Patent Application No. 201610122182.9, filed on Mar. 3, 2016. The disclosures of the aforementioned applications are hereby incorporated by reference in their entireties.

TECHNICAL FIELD

Embodiments of the present invention relate to the communications field, and more specifically, to a communication method and apparatus applied to a hyper cell.

BACKGROUND

In a current system, a cell usually needs to complete communication between a network side and user equipment (UE). UE in the cell usually has two working states: a connected state and an idle state. The cell configures, for the UE in the connected state, a cell radio network temporary identity (C-RNTI) that can uniquely identify the UE in the cell, and the UE can perform data communication in the cell based on the C-RNTI using a dedicated uplink/downlink resource.

When the UE has no service or a service of the UE is not busy, a network instructs the UE to enter the idle state. When the UE in the idle state needs to send uplink data or receive downlink data, the UE initiates random access (RA) and a radio resource control (RRC) connection setup process, so that the UE can re-obtain the C-RNTI and enter the connected state, and then can use the dedicated uplink/downlink resource again to perform data communication.

The following details, with reference to FIG. 1 and FIG. 2, a process in which UE enters a connected state from an idle state. FIG. 1 describes a mobile originated (MO) procedure, that is, a procedure in which the UE in the idle state needs to proactively send uplink data.

101. The UE sends a random access preamble (RA Preamble) sequence to a base station, where before sending an uplink access preamble sequence, the UE usually has completed downlink synchronization with a system, but has not performed uplink synchronization, and the base station can learn, by using the preamble sequence, that the UE expects to set up a connection to the base station.

102. The base station sends a random access response (RA Response) to the UE, where the random access response usually includes a timing advance command field (Timing Advance Command) that can be used to adjust uplink sending time of the UE, to ensure uplink synchronization of the UE, and in addition, the random access response is usually further used to allocate an uplink resource and a temporary C-RNTI to the UE.

103. The UE sends an RRC connection request message on the uplink resource indicated by the random access response.

104. The base station sends an RRC connection setup message to the UE using a downlink shared channel, so that the UE can complete contention analysis based on this message, and then upgrade the temporary C-RNTI obtained in step 102 as a C-RNTI of the UE.

105. The UE sends an RRC connection setup complete message to the base station, where the message includes a service request, and the base station sets up an S1 interface on such basis, that is, is connected to a core network (CN).

After the steps are performed, the UE enters the connected state from the idle state, obtains the C-RNTI that uniquely identifies the UE in the cell, and maintains uplink synchronization with a base station side. The UE can set up a data bearer in the connected state by using an RRC connection, and send the uplink data to the base station.

FIG. 2 describes a mobile terminated (MT) procedure, that is, a procedure in which a network side needs to send downlink data to the UE in the idle state. When the network side needs to send data, the network side delivers a paging message to the UE, as described in step 200 in FIG. 2. After receiving the paging message, the UE initiates uplink access and an RRC connection setup process, and enters the connected state from the idle state, that is, step 201 to step 205 in FIG. 2. These steps are similar to step 1o1 to step 105 in FIG. 1, and details are not described herein again.

It can be learned from descriptions in FIG. 1 and FIG. 2 that when the UE needs to enter the connected state from the idle state, the UE needs to perform processes such as random access and RRC connection setup. In other words, in the current system, the UE in the idle state can re-access the system only after a complex signaling procedure is performed, causing relatively low efficiency.

SUMMARY

This application provides a communication method and apparatus applied to a hyper cell, to improve efficiency of accessing a system by UE.

According to a first aspect, a communication method applied to a hyper cell is provided. The method includes determining, by UE in a power saving state that is in a hyper cell, that there is to-be-sent uplink data. The hyper cell includes a plurality of transmission points (TP), the hyper cell identifies the UE using a dedicated user equipment identity (DUI), and the UE in the power saving state reserves the DUI. The method also includes sending, by the UE, an uplink instruction message to a controller based on the DUI using a preconfigured uplink resource, where the uplink instruction message is used to instruct the UE to enter an activated state. The method also includes sending, by the UE in the activated state, the uplink data to the controller. It should be understood that the controller may be located on a radio access network side. For example, the controller may be a network element in a radio access network. In this case, the controller may be referred to as a radio access network controller. The controller may alternatively be located in a core network. For example, the controller may be a network element in a core network. Optionally, the controller may be referred to as a hyper cell controller. Optionally, in an implementation, the sending, by the UE, an uplink instruction message to a controller based on the DUI using a preconfigured uplink resource may include: sending, by the UE, the uplink instruction message including the DUI on the preconfigured uplink resource; or sending, on the preconfigured uplink resource, the uplink instruction message scrambled by using the DUI.

The sending, by the UE in the activated state, the uplink data to the controller may include: obtaining, by the UE in the activated state, configuration information of a dedicated uplink resource from the controller; and sending, by the UE in the activated state, the uplink data by using the dedicated uplink resource.

In this solution, not only the UE in the power saving state reserves the DUI, but also the uplink resource is preconfigured for the UE. Therefore, when the UE has the to-be-sent uplink data, the UE can quickly enter the activated state based on the DUI by using the uplink resource, with no need to perform a complex RRC connection setup process. This improves efficiency of entering the activated state by the UE.

With reference to the first aspect, in a first implementation of the first aspect, the method further includes: sending, by the UE, some data of the uplink data by using the uplink resource; and the sending, by the UE in the activated state, the uplink data to the controller includes: sending, by the UE in the activated state, remaining data of the uplink data except the some data to the controller.

In this solution, the preconfigured uplink resource not only bears the uplink instruction message, but also bears some uplink data of the UE. This can avoid a resource waste.

With reference to the first aspect or the first implementation of the first aspect, in a second implementation of the first aspect, the uplink instruction message is a scheduling request (SR) message or a buffer status report (BSR). The scheduling request message may also be referred to as an uplink scheduling request. The scheduling request is specifically used to indicate, to the controller, that the UE has the to-be-sent uplink data, that is, by sending the scheduling request, the UE not only indicates, to the controller, that the UE has the to-be-sent uplink data, but also indicates, to the controller, that the UE has entered the activated state. Similarly, the BSR indicates a specific amount of to-be-sent uplink data of the UE, that is, by sending the scheduling request, the UE not only indicates, to the controller, that the UE has the to-be-sent uplink data, but also indicates, to the controller, that the UE has entered the activated state.

With reference to any one of the first aspect or the foregoing implementations of the first aspect, in a third implementation of the first aspect, the uplink resource is a grant-free uplink resource, where the grant-free uplink resource is a shared uplink resource allocated for the UE in the power saving state, for example, may be a physical uplink shared channel (PUSCH) allocated for the UE in the power saving state.

The controller does not need to allocate, for the UE, a resource dedicated for sending the uplink instruction message, but enables the UE to send the uplink instruction message to the controller by using the grant-free uplink resource. This simplifies signaling exchange between the UE and a network side.

With reference to the first aspect, in a fourth implementation of the first aspect, the UE in the power saving state sends a tracking signal continuously in the hyper cell based on the DUI, and the UE sends the uplink instruction message by using the tracking signal.

In this implementation, the UE may send the uplink instruction message by using the tracking signal, with no need to allocate, for the UE, the resource dedicated for sending the uplink instruction message. This reduces system signaling overheads.

The tracking signal may also be referred to as a UE location tracking signal. That is, the network side may determine a UE location based on the tracking signal sent by the UE. Specifically, the tracking signal may be an uplink reference signal sent by the UE. When the UE in the power saving state does not need to send uplink data, the UE may send a common tracking signal; when the UE in the power saving state needs to send uplink data, the UE may send a dedicated tracking signal. When detecting that the UE in the power saving state sends the dedicated tracking signal, the network side may determine that the UE has the to-be-sent uplink data.

With reference to the fourth implementation of the first aspect, in a fifth implementation of the first aspect, the tracking signal sent by the UE includes a common tracking signal and a dedicated tracking signal, the UE implicitly sends the uplink instruction message by sending the dedicated tracking signal, and a time-frequency resource or code resource for the dedicated tracking signal is different from that for the common tracking signal.

The tracking signal is classified into the common tracking signal and the dedicated tracking signal, and the UE implicitly sends the uplink instruction message by sending the dedicated tracking signal, with no need to allocate the dedicated resource for the uplink instruction message. This reduces system signaling overheads.

With reference to the fourth or fifth implementation of the first aspect, in a sixth implementation of the first aspect, the tracking signal is sent by using a dedicated uplink notification channel, or the tracking signal is sent by using a dedicated time-frequency resource.

With reference to any one of the first aspect or the foregoing implementations of the first aspect, in a seventh implementation of the first aspect, the method further includes: obtaining, by the UE, a first mapping relationship table from a network side, where the first mapping relationship table is used to indicate a one-to-one correspondence between a location of the UE, a TP in the hyper cell, and a reference timing advance; and determining, by the UE based on the current location of the UE, a timing advance for uplink synchronization by using the first mapping relationship table.

With reference to any one of the first aspect or the foregoing implementations of the first aspect, in an eighth implementation of the first aspect, the method further includes: obtaining, by the UE, a second mapping relationship table from the network side, where the second mapping relationship table is used to indicate a correspondence between a signal strength of a TP in the hyper cell and a reference timing advance; measuring, by the UE, a current signal strength of the TP in the hyper cell; and determining, by the UE based on the current signal strength of the TP in the hyper cell, a timing advance for uplink synchronization by using the second mapping relationship table.

According to a second aspect, a communication method applied to a hyper cell is provided. The method includes: when a controller prepares to send downlink data to a UE in a power saving state, receiving, by the UE, a downlink instruction message from the controller by using a preconfigured downlink resource, where the downlink instruction message is used to instruct the UE to enter an activated state. The method also includes sending, by the UE, a response message for the downlink instruction message to the controller, where the response message is used to indicate that the UE has entered the activated state. The method also includes receiving, by the UE in the activated state, the downlink data from the controller, where the hyper cell includes a plurality of TPs, the hyper cell identifies the UE by using a DUI, and the UE in the power saving state reserves the DUI.

The receiving, by the UE in the activated state, the downlink data from the controller may include: obtaining, by the UE in the activated state, configuration information of a dedicated downlink resource from the controller; and receiving, by the UE in the activated state, the downlink data by using the dedicated downlink resource.

In this solution, the UE in the power saving state reserves the DUI, and the downlink resource is preconfigured for the UE. Therefore, when the controller needs to send the downlink data to the UE, the controller can instruct, based on the DUI by using the downlink resource, the UE to enter the activated state, with no need to perform a complex RRC connection setup process. This improves efficiency of accessing a system by the UE.

With reference to the second aspect, in a first implementation of the second aspect, the method further includes: receiving, by the UE, some data of the downlink data from the controller by using the downlink resource; and the receiving, by the UE in the activated state, the downlink data from the controller includes: receiving, by the UE in the activated state from the controller, remaining data of the downlink data except the some data.

In this solution, the preconfigured downlink resource not only bears the downlink instruction message, but also bears some downlink data of the UE. This can avoid a resource waste.

With reference to the second aspect or the first implementation of the second aspect, in a second implementation of the second aspect, the downlink instruction message is a paging message, and the downlink resource is used to bear the paging message; or the downlink instruction message is a notification message, and the downlink resource is used to bear the notification message; or the downlink instruction message is a reconfiguration message, and the reconfiguration message includes configuration information of a dedicated resource for the UE. The reconfiguration message is used to configure the dedicated resource for the UE, so that after the UE enters the activated state, the UE performs communication and data transmission with the controller by using the dedicated resource. That is, the reconfiguration message is used to inform, in an implicit indication manner, that the UE has entered the activated state.

With reference to any one of the second aspect or the foregoing implementations of the second aspect, in a third implementation of the second aspect, the downlink resource is a grant-free downlink resource, where the grant-free downlink resource is a shared downlink resource allocated for the UE in the power saving state, for example, may be a physical downlink shared channel (PDSCH) allocated for the UE in the power saving state.

With reference to any one of the second aspect or the foregoing implementations of the second aspect, in a fourth implementation of the second aspect, the downlink instruction message includes a timing advance and/or configuration information of a resource used to bear the response message.

According to a third aspect, a communication method applied to a hyper cell is provided. The method includes, when UE in a power saving state that is in a hyper cell has to-be-sent uplink data, receiving, by a controller, an uplink instruction message from the UE. The hyper cell includes a plurality of TPs. The hyper cell identifies the UE using a DUI. The UE in the power saving state reserves the DUI. The uplink instruction message is sent by the UE based on the DUI by using a preconfigured uplink resource, and the uplink instruction message is used to indicate that the UE has entered an activated state. The method also includes determining, by the controller based on the uplink instruction message, that the UE has entered the activated state; and receiving, by the controller, the uplink data from the UE in the activated state.

The receiving, by the controller, the uplink data from the UE in the activated state may include: sending, by the controller, configuration information of a dedicated uplink resource to the UE in the activated state; and receiving, by the controller, the uplink data from the UE in the activated state by using the dedicated uplink resource.

In this solution, not only the UE in the power saving state reserves the DUI, but also the uplink resource is preconfigured for the UE. Therefore, when the UE has the to-be-sent uplink data, the UE can quickly enter the activated state based on the DUI by using the uplink resource, with no need to perform a complex RRC connection setup process. This improves efficiency of entering the activated state by the UE.

With reference to the third aspect, in a first implementation of the third aspect, the method further includes: receiving, by the controller, some data of the uplink data from the UE by using the uplink resource; and the receiving, by the controller, the uplink data from the UE in the activated state includes: receiving, by controller from the UE in the activated state, remaining data of the uplink data except the some data.

In this solution, the preconfigured uplink resource not only bears the uplink instruction message, but also bears some uplink data of the UE. This can avoid a resource waste.

With reference to the third aspect or the first implementation of the third aspect, in a second implementation of the third aspect, the uplink instruction message is a scheduling request message or a buffer status report.

With reference to the third aspect or the first implementation of the third aspect, in a third implementation of the third aspect, the uplink resource is a grant-free uplink resource, and the grant-free uplink resource is a shared uplink resource allocated for the UE in the power saving state, for example, may be a PUSCH allocated for the UE in the power saving state.

The controller does not need to allocate, for the UE, a resource dedicated for sending the uplink instruction message, but enables the UE to send the uplink instruction message to the controller by using the grant-free uplink resource. This simplifies signaling exchange between the UE and a network side.

With reference to the third aspect, in a fourth implementation of the third aspect, the UE in the power saving state sends a tracking signal continuously in the hyper cell based on the DUI, and the UE sends the uplink instruction message by using the tracking signal.

In this implementation, the UE may send the uplink instruction message using the tracking signal, with no need to allocate, for the UE, the resource dedicated for sending the uplink instruction message. This reduces system signaling overheads.

With reference to the fourth implementation of the third aspect, in a fifth implementation of the third aspect, the tracking signal sent by the UE includes a common tracking signal and a dedicated tracking signal, the UE implicitly sends the uplink instruction message by sending the dedicated tracking signal, and a time-frequency resource or code resource for the dedicated tracking signal is different from that for the common tracking signal.

With reference to the fourth or fifth implementation of the third aspect, in a sixth implementation of the third aspect, the tracking signal is sent by using a dedicated uplink notification channel, or the tracking signal is sent by using a dedicated time-frequency resource.

The tracking signal is classified into the common tracking signal and the dedicated tracking signal, and the UE implicitly sends the uplink instruction message by sending the dedicated tracking signal, with no need to allocate the dedicated resource for the uplink instruction message. This reduces system signaling overheads.

According to a fourth aspect, a communication method applied to a hyper cell is provided. The method further includes: receiving, by a controller, downlink data from UE in a power saving state. The method also includes sending, by the controller, a downlink instruction message to the UE using a preconfigured downlink resource, where the downlink instruction message is used to instruct the UE to enter an activated state. The method also includes receiving, by the controller from the UE, a response message for the downlink instruction message, where the response message is used to indicate that the UE has entered the activated state. The method also includes sending, by the controller, the downlink data to the UE in the activated state, where the hyper cell includes a plurality of TPs, the hyper cell identifies the UE by using a DUI, and the UE in the power saving state reserves the DUI.

The sending, by the controller, the downlink data to the UE in the activated state may include: sending, by the controller, configuration information of a dedicated downlink resource to the UE in the activated state; and sending, by the controller, the downlink data to the UE in the activated state by using the dedicated downlink resource.

In this solution, the UE in the power saving state reserves the DUI, and the downlink resource is preconfigured for the UE. Therefore, when the controller needs to send the downlink data to the UE, the controller can instruct, based on the DUI using the downlink resource, the UE to enter the activated state, with no need to perform a complex RRC connection setup process. This improves efficiency of entering the activated state by the UE.

With reference to the fourth aspect, in a first implementation of the fourth aspect, the method further includes: sending, by the controller, some data of the downlink data to the UE by using the downlink resource; and the sending, by the controller, the downlink data to the UE in the activated state includes: sending, by the controller, remaining data of the downlink data except the some data to the UE in the activated state.

In this solution, the preconfigured downlink resource not only bears the downlink instruction message, but also bears some downlink data of the UE. This can avoid a resource waste, and improve data transmission efficiency of the UE.

With reference to the fourth aspect or the first implementation of the fourth aspect, in a second implementation of the fourth aspect, the downlink instruction message is a paging message, and the downlink resource is used to bear the paging message; or the downlink instruction message is a notification message, and the downlink resource is used to bear the notification message; or the downlink instruction message is a reconfiguration message, and the reconfiguration message includes configuration information of a dedicated resource for the UE. The reconfiguration message is used to configure the dedicated resource for the UE, so that after the UE enters the activated state, the UE performs communication and data transmission with the controller by using the dedicated resource. That is, the reconfiguration message is used to inform, in an implicit indication manner, that the UE has entered the activated state.

With reference to any one of the fourth aspect or the foregoing implementations of the fourth aspect, in a third implementation of the fourth aspect, the downlink resource is a grant-free downlink resource, where the grant-free downlink resource is a shared downlink resource allocated for the UE in the power saving state, for example, may be a PDSCH allocated for the UE in the power saving state.

With reference to any one of the fourth aspect or the foregoing implementations of the fourth aspect, in a fourth implementation of the fourth aspect, the downlink instruction message includes a timing advance and/or configuration information of a resource used to bear the response message.

According to a fifth aspect, a communication method applied to a hyper cell is provided. The method includes performing, by UE in a power saving state, data transmission with a controller by using a grant-free resource, where the UE is UE in the hyper cell, the hyper cell includes a plurality of transmission points TPs, a DUI is used to identify the UE in the hyper cell, and the UE in the power saving state reserves the DUI.

With reference to the fifth aspect, in a first implementation of the fifth aspect, the grant-free resource is a grant-free downlink resource, and the performing, by UE in a power saving state, data transmission with a controller by using a grant-free resource includes: receiving, by the UE in the power saving state, downlink data from the controller by using the grant-free downlink resource.

With reference to the fifth aspect, in a second implementation of the fifth aspect, the grant-free resource is a grant-free uplink resource, and the performing, by UE in a power saving state, data transmission with a controller by using a grant-free resource includes: sending, by the UE in the power saving state, uplink data to the controller by using the grant-free uplink resource.

According to a sixth aspect, a communication method applied to a hyper cell is provided. The method includes performing, by a controller, data transmission with UE in a power saving state using a grant-free resource, where the UE is UE in the hyper cell, the hyper cell includes a plurality of TPs, a DUI is used to identify the UE in the hyper cell, and the UE in the power saving state reserves the DUI.

With reference to the sixth aspect, in a first implementation of the sixth aspect, the grant-free resource is a grant-free downlink resource, and the performing, by a controller, data transmission with UE in a power saving state by using a grant-free resource includes: sending, by the controller, downlink data to the UE in the power saving state by using the grant-free downlink resource.

With reference to the sixth aspect, in a second implementation of the sixth aspect, the grant-free resource is a grant-free uplink resource, and the performing, by a controller, data transmission with UE in a power saving state by using a grant-free resource includes: receiving, by the controller, uplink data from the UE in the power saving state by using the grant-free uplink resource.

According to a seventh aspect, UE is provided, where the UE includes modules configured to perform the method in the first aspect.

According to an eighth aspect, UE is provided, where the UE includes modules configured to perform the method in the second aspect.

According to a ninth aspect, a controller is provided, where the controller includes modules configured to perform the method in the third aspect.

According to a tenth aspect, a controller is provided, where the controller includes modules configured to perform the method in the fourth aspect.

According to an eleventh aspect, UE is provided, where the UE includes modules configured to perform the method in the fifth aspect.

According to a twelfth aspect, a controller is provided, where the controller includes modules configured to perform the method in the sixth aspect.

According to a thirteenth aspect, UE is provided, where the UE includes a memory, a processor, and a transceiver; the memory is configured to store a program; the processor is configured to execute the program; and when the program is executed, the processor performs the method in the first aspect by using the transceiver.

According to a fourteenth aspect, UE is provided, where the UE includes a memory, a processor, and a transceiver; the memory is configured to store a program; the processor is configured to execute the program; and when the program is executed, the processor performs the method in the second aspect by using the transceiver.

According to a fifteenth aspect, a controller is provided, where the controller includes a memory, a processor, and a transceiver; the memory is configured to store a program; the processor is configured to execute the program; and when the program is executed, the processor performs the method in the third aspect by using the transceiver.

According to a sixteenth aspect, a controller is provided, where the controller includes a memory, a processor, and a transceiver; the memory is configured to store a program; the processor is configured to execute the program; and when the program is executed, the processor performs the method in the fourth aspect by using the transceiver.

According to a seventeenth aspect, UE is provided, where the UE includes a memory, a processor, and a transceiver; the memory is configured to store a program; the processor is configured to execute the program; and when the program is executed, the processor performs the method in the fifth aspect by using the transceiver.

According to an eighteenth aspect, a controller is provided, where the controller includes a memory, a processor, and a transceiver; the memory is configured to store a program; the processor is configured to execute the program; and when the program is executed, the processor performs the method in the sixth aspect by using the transceiver.

According to a nineteenth aspect, a communications system is included, including the UE in the seventh aspect and the TP described in the ninth aspect.

According to a twentieth aspect, a communications system is included, including the UE in the thirteenth aspect and the TP described in the fifteenth aspect.

According to a twenty-first aspect, a system chip is provided, including an input interface, an output interface, at least one processor, and a memory, where the input interface, the output interface, the processor, and the memory are connected by using a bus, the processor is configured to execute code in the memory, and when the code is executed, the processor implements the method in the first aspect.

According to a twenty-second aspect, a system chip is provided, including an input interface, an output interface, at least one processor, and a memory, where the input interface, the output interface, the processor, and the memory are connected by using a bus, the processor is configured to execute code in the memory, and when the code is executed, the processor implements the method in the third aspect.

According to a twenty-third aspect, a computer readable medium is provided, where the computer readable medium is configured to store program code to be executed by a radio access network controller, and the program code includes an instruction used to perform the method in the first aspect.

According to a twenty-fourth aspect, a computer readable medium is provided, where the computer readable medium is configured to store program code to be executed by UE, and the program code includes an instruction used to perform the method in the third aspect.

In some implementations, based on an uplink reference signal sent by the UE, the controller in the hyper cell continuously updates and maintains a TP set used to serve the UE, so as to perform mobility management on the UE.

In some implementations, the UE in the power saving state sends a tracking signal based on the reserved DUI, where the tracking signal may also be referred to as an uplink reference signal. For example, the tracking signal may be a sounding reference signal (SRS).

In some implementations, the uplink resource preconfigured for the UE may be a shared or dedicated uplink resource, for example, may be one or more of a physical uplink shared channel (PUSCH), an UL grant, a scheduling resource (SR), and an uplink contention resource.

In some implementations, the DUI is used to uniquely identify the UE in the hyper cell.

In some implementations, the network side may be a base station side, a controller side, or both a base station side and a radio access network side.

In some implementations, information, message, or data exchange between the UE and the controller may be performed by forwarding by using a macro base station in the hyper cell.

In this application, a DUI of UE in an idle state is reserved, and an uplink resource or a downlink resource is preconfigured for the UE in the power saving state, so that the UE can quickly enter the activated state, with no need to perform a complex RRC connection setup process.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
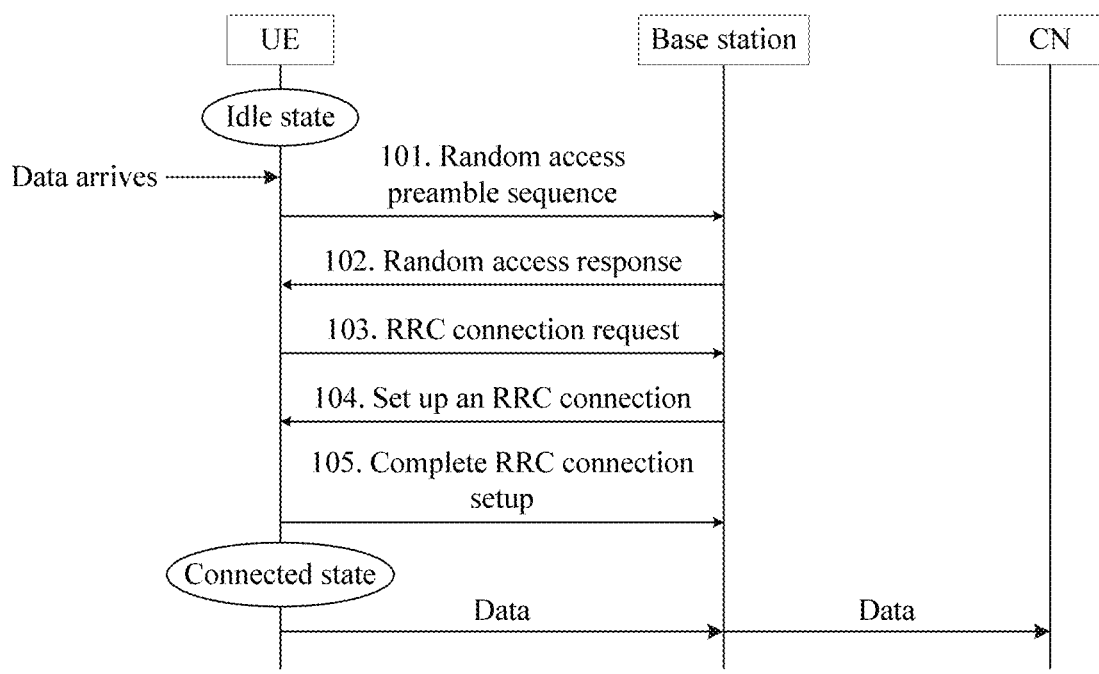
FIG. 1 is a schematic flowchart of an existing MO procedure.
Figure 2:
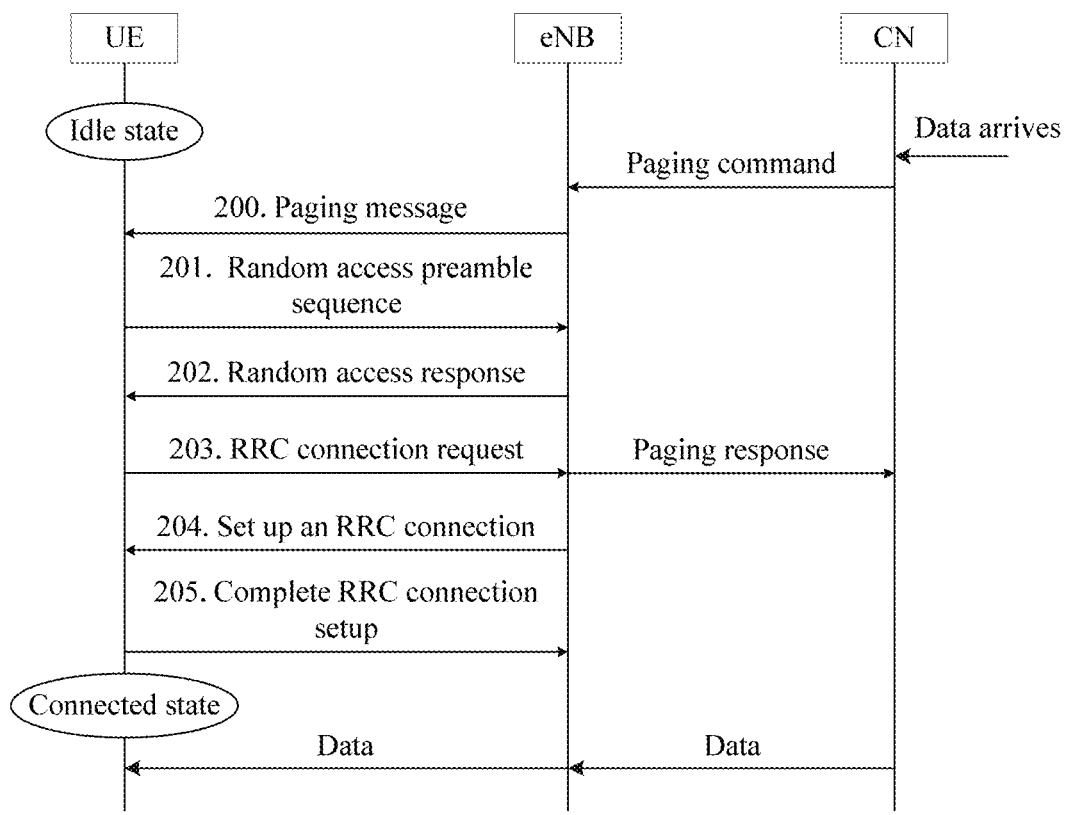
FIG. 2 is a schematic flowchart of an existing MT procedure.

It should be understood that the technical solutions of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, a Long Term Evolution Advanced (LTE-A) system, a Universal Mobile Telecommunications System (UMTS) system, and a 5G system.

It should be further understood that in the embodiments of the present invention, user equipment (UE) includes but is not limited to a mobile station (MS), a mobile terminal, a mobile telephone, a handset, portable equipment, or the like. The user equipment may communicate with one or more core networks using a radio access network (RAN). For example, the user equipment may be a mobile telephone (or referred to as a "cellular" telephone) or a computer having a wireless communication function; or the user equipment may be a portable mobile apparatus, a pocket-sized mobile apparatus, a handheld mobile apparatus, a computer built-in mobile apparatus, or an in-vehicle mobile apparatus.

To resolve a problem in the current system that UE enters a system (changes from an idle state to a connected state) slowly, in the embodiments of the present invention, a concept of a hyper cell (also referred to as a cell cluster) is first introduced, and an idea that a network follows UE is proposed to perform mobility management on UE. Based on the hyper cell, two new states are defined for the UE in the embodiments of the present invention: a power saving state (or an ECO state, where ECO represents ecology, conservation, and optimization), and an activated state (or an active state). The two states are similar to the existing idle state and connected state, but also greatly differ from the existing idle state and connected state, and details are described in the following. In the following, a solution about how UE in the power saving state is enabled to re-access the system quickly (quickly enter the activated state) is provided in embodiments of the present invention. Why the hyper cell is introduced is first described in the following.

In the current system, to ensure service continuity of user equipment (UE), mobility management needs to be performed on the UE. For example, when moving from a coverage area of a source cell to a coverage area of a target cell, the UE needs to complete a handover between cells in a timely manner.

However, in an existing communications system, a design idea for mobility management is a design idea that UE follows a network. Using UE in a connected state as an example, to implement mobility management on the UE, each cell in a network sends a downlink reference signal for measurement performed by the UE. The UE reports a measurement result to a network side in a form of a measurement report, the network determines handover based on the measurement report from the UE, and the UE is handed over to a cell having a good signal condition, for data transmission.

However, in a subsequent evolution process of a mobile communications system, to meet a requirement on a huge amount of data communication, massive small cells may be deployed in a hotspot area in a centralized manner. In this case, if the design idea that UE follows a network continues to be used, a problem that mobility management on UE is difficult is caused. For example, in a hotspot area, UE needs to measure massive small cells; this raises a relatively high requirement on a measurement capability of the UE. For another example, UE can be handed over only after performing measurement and reporting a measurement report, and due to a small coverage area of a small cell, the UE may quickly move out of the coverage area of the small cell. As a result, a handover may fail because the handover is not performed in a timely manner, for example, sending the measurement report to the small cell fails or sending a handover command fails. For still another example, because ultra dense cell deployment is performed, operations such as reporting a measurement report and performing a handover may cause massive air interface signaling, consuming massive air interface resources and massive network processing resources.

As mentioned above, the design idea that UE follows a network is used for mobility management on UE in the current system. However, when the design idea is applied to a hotspot area in which massive small cells are deployed in a centralized manner, a problem that mobility management on the UE is difficult is caused. In the embodiments of the present invention, a concept of a hyper cell is introduced, and an idea that a network follows UE is proposed, to be specific, mobility management is performed by using UE as a center, so as to perform valid mobility management on the UE in the hotspot area.

Figure 3:
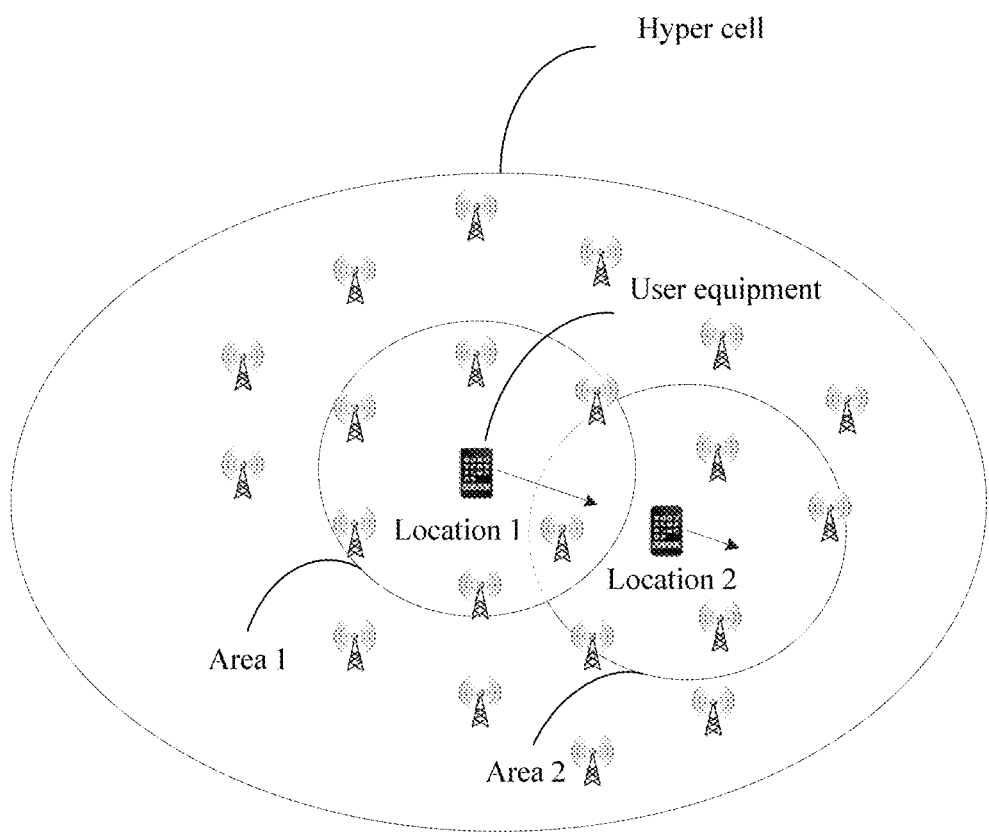
FIG. 3 is a schematic diagram of a scenario of a hyper cell.

As shown in FIG. 3, a hyper cell ID may be configured for a hyper cell. The hyper cell may include a plurality of intra-frequency and/or inter-frequency TPs (optionally, in an embodiment, the hyper cell may include only one TP); or the hyper cell may include a plurality of cells (optionally, in an embodiment, the hyper cell may include only one cell). It can be understood that an ID of a TP (or a cell) in the hyper cell may keep the same as the hyper cell ID, or both are configured separately. UE moves in the hyper cell, and if a prior-art mobility management mode is still used, the UE performs frequent cell handovers because each TP is corresponding to one or more cells (or small cells). In this embodiment of the present invention, usually, same common information may be configured for TPs in the hyper cell, for example, same content is sent over channels such as a synchronization channel, a downlink reference channel, and a broadcast channel. When the UE moves in the hyper cell, the UE is unaware of a serving cell change because the TPs in the hyper cell have same common information. For example, specifically, the UE does not need to measure a downlink reference signal sent by each cell in the hyper cell. On the contrary, the UE sends an uplink reference signal, and a network side measures the uplink reference signal from the UE, and selects, based on a measurement result, one or more TPs for the UE for data transmission. To be specific, in a process in which the UE moves in the hyper cell, the network side may complete tasks of uplink reference signal measurement and a TP change, so that the UE is unaware of the TP change as much as possible. This is equivalent to that a working mode "no cell" is introduced. In this way, not only service continuity can be ensured, but also air interface signaling overheads can be reduced. In addition, the UE does not need to undertake burdensome measurement tasks; design complexity is correspondingly reduced.

It should be understood that the working mode "no cell" may refer to: The UE is responsible for sending an uplink reference signal, and the network side continuously updates and maintains a TP that provides a data communications service for the UE, so that the UE is unaware of a TP change as much as possible. It should be understood that the "cell"

herein is a normal cell in the current system, and the working mode "no cell" in this application may also be referred to as a hyper-cell working mode.

In the hyper cell, a DUI may be allocated for the UE, and the hyper cell may identify the UE based on the DUI. For example, a TP in the hyper cell may provide a data communications service for the UE based on the DUI; and the TP in the hyper cell may further measure, based on the DUI, the uplink reference signal sent by the UE. Specifically, the DUI may be any one of or any combination of identifiers such as a C-RNTI, a hyper cell ID, a TP ID, a cell ID, and a newly defined ID.

It should be understood that no limitation is imposed on a specific type of the TP in this embodiment of the present invention. For example, the TP may be a normal base station (for example, a NodeB or an eNB), may be a remote radio module, may be a pico base station, or may be a relay (relay) or any other radio access device.

Optionally, in an embodiment, the TP may report, to a RAN controller, whether the TP supports a no-cell capability, and the RAN controller performs no-cell configuration on a TP supporting the no-cell capability. The "no-cell capability" herein may be various capabilities required when the TP works in the hyper cell, for example, a capability of measuring the uplink reference signal sent by the UE.

Descriptions are provided by using a manner of configuring the capability, supported by the TP, of measuring the uplink reference signal as an example. First, the RAN controller may send measurement configuration signaling (or referred to as measurement control signaling) to the TP. Specifically, the measurement configuration signaling may be used to configure at least one of the following measurement configuration parameters: a DUI, an uplink reference signal configuration, a carried measurement identifier, a measurement event name, a measurement interval, a measurement report reporting mode, a measurement reporting condition, and a measurement parameter. In addition, a set of measurement configuration parameters may be configured for each DUI (or each UE), or a set of measurement configuration parameters may be configured for all DUIs (or all UEs) in the hyper cell. Further, the measurement parameter may include at least one of uplink reference signal received quality, an uplink reference signal received power, a signal to noise ratio, a signal to interference plus noise ratio, a path loss, and the like. The measurement configuration parameters may further include at least one of thresholds of the foregoing parameters. When a measurement parameter detected by the TP meets the measurement reporting condition, the TP sends a measurement report, where the measurement report includes a corresponding measurement result. The measurement report reporting mode may include at least one of an event triggered reporting mode, a periodic reporting mode, and a mode of combining event triggered reporting with periodic reporting. The event triggered reporting mode may mean that when the uplink reference signal measured by the TP meets a threshold in the measurement configuration parameters, the TP sends a measurement report to the RAN controller. The periodic reporting mode may mean that the TP periodically sends a measurement report to the RAN controller.

After the RAN controller configures a measurement configuration parameter of the uplink reference signal for the TP, the TP can measure, based on the measurement configuration parameter, the uplink reference signal sent by the UE, and report a measurement result to the RAN controller based on the measurement reporting mode.

It should be noted that the measurement configuration signaling may instruct the TP to perform intra-frequency measurement, or may instruct the TP to perform inter-frequency measurement. Alternatively, the RAN controller may send measurement configuration signaling for intra-frequency measurement to the TP, or may send measurement configuration signaling for inter-frequency measurement to the TP. Specifically, assuming that a working frequency of the TP is F1, and a frequency at which the UE sends a reference signal is F2, the RAN controller may instruct the TP to perform inter-frequency measurement, to be specific, instruct the TP to measure, at F2, an uplink reference signal sent by the UE. Alternatively, in another implementation, the RAN controller may instruct the UE to send an uplink reference signal at a working frequency of the TP, namely, a frequency band F1, and then instruct the TP to perform intra-frequency measurement. In this way, the TP only needs to measure the uplink reference signal at the working frequency band of the TP. It should be understood that the foregoing two measurement manners may be used separately, or may be used in a combined way, and no specific limitation is imposed thereon in this embodiment of the present invention.

When receiving a measurement report reported by each TP, the RAN controller may determine, based on the measurement report reported by the TP, whether to update a TP set used for transmitting data of the UE. Specifically, the RAN controller may compare, one by one, the measurement results reported by all the TPs with measurement results reported by a TP set used for currently transmitting data of the UE, may compare differences or absolute differences between the measurement results reported by all the TPs and measurement results reported by TPs in a TP set used for currently transmitting data of the UE, with a threshold one by one, may compare, one by one, the measurement results reported by all the TPs with an average value of measurement results reported by a TP set used for currently transmitting data of the UE, so as to determine, based on a comparison result, whether to update the TP set used for transmitting the data of the UE.

For example, it is assumed that the measurement parameter is the reference signal received quality. The TP set used for currently transmitting the data of the UE includes a TP1 and a TP2; the RAN controller allocates a measurement task to the TP1, the TP2, a TP3, and a TP4 separately, to be specific, when the reference signal received quality is higher than a threshold, the TP1, the TP2, the TP3, the TP4 send measurement reports to the RAN controller. After receiving reference signal received quality reported by the TP1, the TP2, and the TP3 separately, the RAN controller may determine, based on the following manner, whether to update the TP set used for transmitting the data of the UE.

Manner 1: The TP3 is directly added to the TP set used for transmitting the data of the UE, that is, the TP set used for transmitting the data of the UE is updated to the TP1, the TP2, and the TP3.

Manner 2: Reference signal received quality reported by the TP3 is separately compared with results reported by the TP1 and the TP2, and if a result from the TP3 is higher than that from at least one of the TP1 and the TP2, or if a difference or an absolute difference between reference signal received quality reported by the TP3 and reference signal received quality reported by the TP1 is higher than a threshold, or if a difference or an absolute difference between reference signal received quality reported by the TP3 and reference signal received quality reported by the TP2 is higher than a threshold, the RAN controller may add the TP3 to the TP set used for transmitting the data of the UE, or the RAN controller may replace the TP1 or the TP2 with the TP3.

It should be noted that if the TP1 and the TP2 belong to a RAN controller 1, and the TP3 and the TP4 belong to a RAN controller 2, a measurement report reported by the TP3 may be forwarded by the RAN controller 2. To avoid a case in which there is a large time difference between receiving, by the RAN controller 1, measurement reports from the TP1 and the TP2 and receiving a measurement report from the TP3 forwarded by the RAN controller 2, time information may be introduced in a measurement report, to indicate time for recording a measurement result. It should be understood that the RAN controller 2 may forward all received measurement reports, or may select, according to a specified policy, for example, after measurement result comparison, only some measurement reports for forwarding.

When determining to update the TP set used for transmitting the data of the UE, the RAN controller may notify the UE of this case by using at least one of the following signaling or information: radio resource control RRC signaling, L1 signaling, L2 signaling, and downlink control information (DCI).

It should be noted that no specific limitation is imposed on a name, a type, and a form of a signal that is sent by the UE and that is to be measured by a network in this embodiment of the present invention. That UE sends an uplink reference signal is used as an example in the following, but no limitation is imposed thereon in this embodiment of the present invention. For example, a newly introduced tracking signal used for tracking a UE location, or a sounding reference signal (SRS) may be used.

Based on the hyper cell, two states: a power saving state and an activated state are introduced for the UE in the hyper cell. It should be understood that the power saving state and the activated state described herein are for distinguishing between an idle state and a connected state in the current system. However, this embodiment of the present invention does not exclude a case in which names of the idle state and the connected state are still used after introduction of the hyper cell. In this case, the activated state in this embodiment of the present invention may be corresponding to the connected state, and the power saving state in this embodiment of the present invention may be corresponding to the idle state, or may be corresponding to the connected state. It can be further understood that, as a new UE status, the power saving state may be independent of the hyper cell, that is, the power saving state may also be applicable to the current system, but differ from the idle state and the connected state in the current system. The following details functions and characteristics of the UE in the two states.

The UE in the power saving state continues to reserve the DUI of the UE, and may have some or all of the following functions.

1. The UE may handle some background services and perform small packet transmission.
2. The UE may support downlink scheduling-free transmission, that is, may use a downlink shared resource.
3. The UE may support uplink grant-free transmission, that is, may use an uplink shared resource.
4. The UE may not monitor a dynamic control channel.
5. The UE may perform a small amount of connection management (for example, long-period link self-adaption and long-period measurement).
6. The UE may reserve an RRC connection to a network side.

7. The UE may reserve a signaling-plane bearer and a user-plane bearer with a core network; or may reserve only a signaling-plane bearer with a core network, and delete a user-plane bearer from the core network. When an uplink background service or small-packet data needs to be transmitted, sending may be performed by using the signaling-plane bearer with the core network. For example, access stratum signaling may carry a data packet, or non-access stratum (NAS) signaling may carry a data packet. After the data packet is transmitted to a mobility management entity (MME), the MME identifies the data packet as a background service or small-packet data, and forwards the data packet to a serving gateway (SGW). Optionally, in an implementation, the UE in the power saving state may reserve a signaling-plane bearer with the core network, delete a dedicated user-plane bearer from the core network, and establish a common or default user-plane bearer with the core network. When an uplink background service or small-packet data needs to be transmitted, the uplink background service or the small-packet data may be transmitted using the common or default user-plane bearer with the core network.

8. The UE may send an uplink reference signal periodically, or may send an uplink reference signal after an event triggered condition is met. The event triggered condition may be performing triggering based on a UE speed. For example, a current sending period configured by the network side is T, and a threshold of the UE speed is V. When the UE speed is less than and/or equal to V, the UE may automatically prolong an uplink reference signal sending interval to $N*T$, where N=2, 3, . . . ; further, if the UE is still, an uplink reference signal sending period may be configured to being infinitely great. During specific implementation, a maximum reference signal sending period, for example, 256 s or 30 min, may be configured. Alternatively, the event triggered condition may be performing triggering after the UE detects another hyper cell. For example, when the UE moves to an overlapping coverage area of a plurality of hyper cells, in addition to an ID of a hyper cell in which the UE is currently located, the UE may further detect an ID of another hyper cell; in this case, the UE may send an uplink reference signal.

The UE in the activated state has a DUI, and may have some or all of the following functions:

1. The UE may handle an interaction service and a session service.
2. The UE may use an uplink/downlink shared resource and a dedicated resource.
3. The UE may support fast-connection management (for example, fast link self-adaption and short-period measurement).

As described above, the UE has the two states, and can change between the two states. For example, when service data transmission is no longer performed within a period of time that elapses after data of the UE is transferred, the UE may change from the activated state to the power saving state; the UE in the power saving state may not monitor a dynamic control channel, and only needs to support a small amount of connection management; in this way, the UE in the power saving state consumes less power than that in the activated state.

Optionally, in an embodiment, the UE may measure a parameter or an index to determine whether to change between the power saving state and the activated state. For example, when it is learned through measurement that a parameter or an index meets a threshold, the UE sends instruction information to the network side, and then the network side may control, according to the indication information, the UE to make a status change. Specifically, the RAN controller may deliver a threshold to the UE in advance, where the threshold may be, for example, a size threshold of buffered data of the UE. When the buffered data of the UE exceeds the threshold, the UE reports a measurement report to the RAN controller, and then the RAN controller controls the UE to make a status change. Alternatively, the RAN controller may send a measurement indication to the UE. As indicated by the measurement indication, when the UE learns, through measurement, that a size of buffered data of the UE exceeds a size of data that allows to be sent currently, the UE reports a measurement report to the RAN controller, and then the RAN controller controls the UE to make a status change. Instruction information from the UE may be reported by using L2 signaling, may be reported by using RRC signaling, for example, a measurement report, or may be reported by using initially sent data, for example, indicated by using an indicator bit in an initially sent data block, for example, the indicator bit is set to TRUE for indication. No specific limitation is imposed thereon in this embodiment of the present invention.

Optionally, in an embodiment, the network side may use RRC signaling to instruct the UE to enter an activated state or a power saving state. For example, a new status indication cell may be added to RRC signaling, where the status indication cell may instruct the UE to enter the power saving state or the activated state, and the UE may enter a corresponding state as indicated by the status indication cell.

Still referring to FIG. 3, when UE is at a location 1, a TP set (or may be referred to as a TP cluster) including TPs in an area 1 may transmit data of the UE (or provide a communications service for the UE). When the user equipment moves from the location 1 to a location 2, a TP set including TPs in an area 2 may provide a communications service for the UE. In other words, in a movement process of the UE, a TP that transmits data of the UE may be updated continuously, and the update task may be completed by a network side based on an uplink reference signal sent by the UE. It should be noted that the TP set used for the UE may be divided into an UL TP set and a DL TP set depending on whether a service is an uplink service of the UE or a downlink service of the UE. Update on the UL TP set may be completed by the network side based on the uplink reference signal sent by the UE. Update on the DL TP set may be completed by the network side based on the downlink reference signal sent by the UE. Optionally, in an embodiment, update may be performed by the network side based on a measurement result reported by the UE based on a downlink reference signal.

Figure 4:
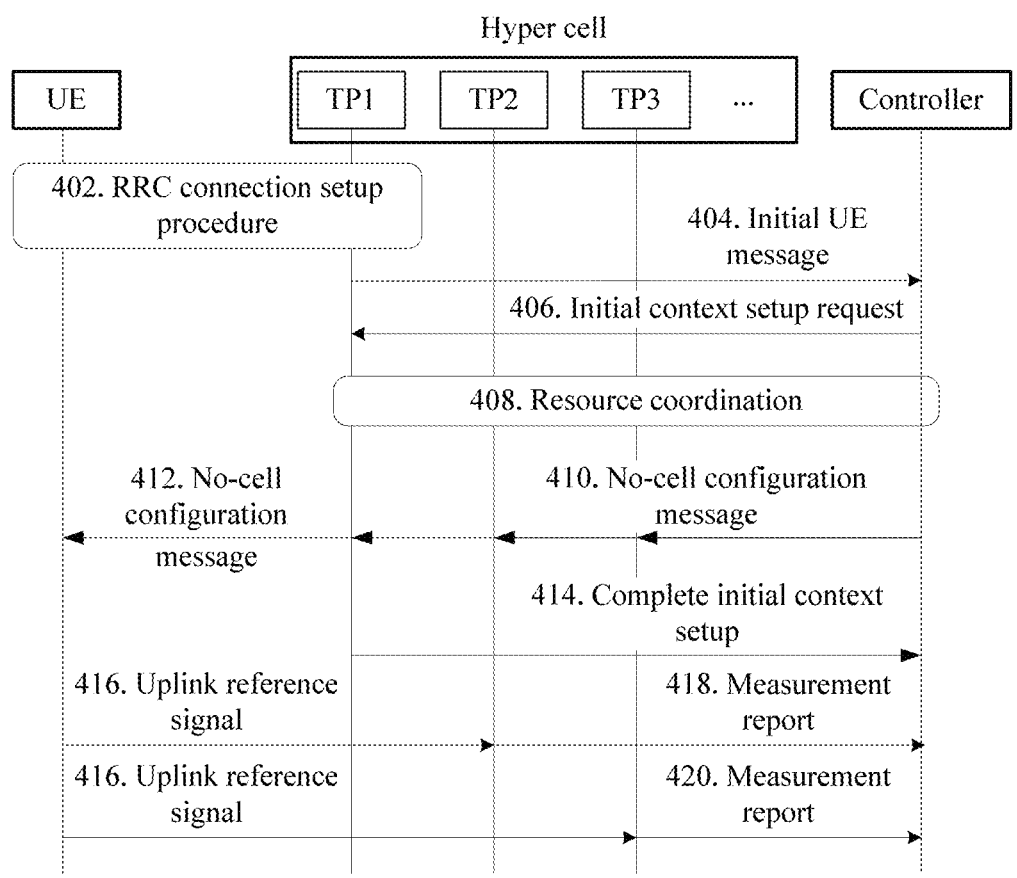
FIG. 4 is a diagram of an example of a communication procedure in a hyper cell.

FIG. 4 is a schematic flowchart of a communication method applied to a hyper cell according to an embodiment of the present invention. It should be understood that FIG. 4 shows detailed communication steps or operations applied to the hyper cell. However, these steps or operations are merely an example. In this embodiment of the present invention, other operations or variations of operations in FIG. 4 may be further performed. In addition, steps in FIG. 4 may be performed in a sequence different from that presented in FIG. 4, and possibly not all operations in FIG. 4 need to be performed.

In all embodiments of the present invention, a controller provides mobility management for UE. The controller may be an independent network element on an access network side, or may be located in a core network, but this is not specifically limited in this embodiment of the present invention. For example, the controller and a TP set may be integrated into a same entity, for example, an access network device, and TPs may be transmission and receiving units of the access network device. Alternatively, the controller may be a TP, and the TP may be or may not be a TP in a TP set that provides a data transmission service for the UE. When the TP is a TP in a TP set that provides a data transmission service for the UE, the controller may directly send signaling to the UE.

The following describes specific steps in FIG. 4.

402. UE initiates initial access, and performs a radio resource control (RRC) connection setup procedure.

In the RRC connection setup process, a related parameter may be carried in a network. The parameter may include at least one of a UE speed, a UE location, a signal situation of a detected neighboring cell, service information, and the like. The parameter may be a parameter obtained through measurement by using a Global Positioning System (GPS) of the UE or in another manner.

404. A hyper cell sends an initial UE message to a controller.

406. The controller sends an initial context setup request to the hyper cell.

408. The controller performs resource coordination with TPs in the hyper cell.

In step 408, the controller may allocate a first TP set and a second TP set to the UE, and perform resource coordination with these TPs. Each TP set includes one or more TPs. A TP in the second TP set may be configured to perform data transmission for the UE. Therefore, the second TP set may also be referred to as a transmission TP set or a transmission cluster for the UE. A TP in the first TP set may be configured to measure an uplink reference signal sent by the UE; therefore, the first TP set may also be referred to as a measurement TP set or a measurement cluster for the UE.

Figure 5:
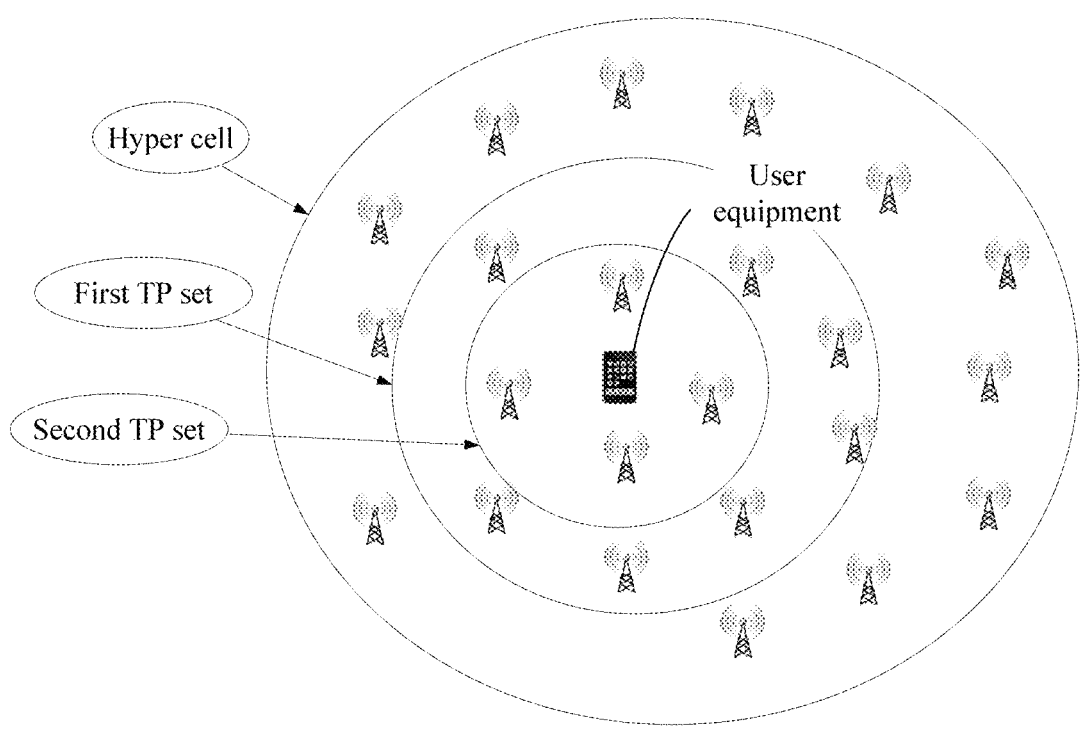
FIG. 5 is a diagram of an example of a manner of mobility management on UE in a hyper cell.

Specifically, the TPs in the first TP set and the second TP set may be TPs surrounding the UE. Generally, the second TP set may be a subset of the first TP set. As shown in FIG. 5, at a current location of the UE, the first TP set includes the second TP set. Optionally, in an embodiment, the first TP set may include the second TP set and a TP layer surrounding the second TP set. It should be noted that a TP set including all TPs in the hyper cell may also be set as the first TP set used for the UE. In this case, all the TPs in the hyper cell need to measure the uplink reference signal sent by the UE. This setting manner may cause relatively heavy network load. Therefore, in an embodiment, some TPs may be selected from the hyper cell to form the second TP set and the first TP set that are used for the UE. Then, the second TP set and the first TP set that are used for the UE may be dynamically updated based on a UE location change.

410. The controller sends no-cell configuration messages to TPs in a second TP set and a first TP set.

The no-cell configuration message may be used to instruct the TP in the second TP set to provide a service for the UE and instruct the TP in the first TP set to measure the uplink reference signal sent by the UE. The no-cell configuration message may include an S-TMSI of the UE. Optionally, in an embodiment, the no-cell configuration message may further include a DUI allocated by the controller for the UE, where the DUI may be used to identify the UE (or uniquely identify the UE) in the hyper cell.

Optionally, in an embodiment, there may be a correspondence between a DUI of the UE and a time-frequency resource (or referred to as a time-frequency sequence) used by the UE to send the uplink reference signal. The TP in the first TP set may determine, based on the DUI of the UE and the correspondence, the time-frequency resource used by the UE to send the uplink reference signal, so as to measure, on the time-frequency resource, the uplink reference signal sent by the UE. Certainly, no limitation is imposed thereon in this embodiment of the present invention. For example, the no-cell configuration information may be used to indicate, to the TP in the first TP set, a location of the time-frequency resource occupied by the uplink reference signal from the UE.

Optionally, in an embodiment, if an update occurs in a TP in the second TP set used for the UE, for example, a TP4 replaces an original TP3, a subsequent processing manner for some data (for example, some data not sent successfully or sent data for which no ACK is received), related to the UE, in the TP4 may be considered. Specifically, if the TP4 and the TP3 belong to a same hyper cell, data not sent by the UE and data for which no ACK is received and that is sent by the UE need to be exchanged between the controller and the TP3; the controller sends the data to the TP4 based on a feedback from the TP3, and the TP4 sends the data to the UE; and the UE sends a corresponding feedback according to a HARQ feedback mechanism configured by the controller. If the TP4 and the TP3 belong to different hyper cells, processing by a Media Access Control (MAC) entity of the UE may still need to be considered. For example, a MAC entity 1 processes data received by a hyper cell 1, and when the TP4 (belongs to a hyper cell 2) is configured to provide a data service for the UE, a mapping relationship between the MAC entity 1 and two hyper cells (the hyper cell 1 and a hyper cell 2) may be carried, to instruct a MAC entity 1 to process data from the TP4; the UE may identify a hyper cell to which a TP belongs, and when TPs replaced as indicated by a configuration indication received by the UE from a network side belong to different hyper cells, the UE may clear buffered data received from the TP3. Certainly, in a network architecture with an ideal latency, a TP may include only a physical layer PHY, a MAC layer and an upper layer thereof are located on a BBU-pool side; therefore, the foregoing data forwarding process is triggered only when a BBU-pool changes. In a network architecture with a non-ideal latency, only a Packet Data Convergence Protocol (PDCP) layer is located on a baseband unit (BBU)-pool side, and all other protocol layers are located on a TP side (or all protocol layers are located on a TP side); in this case, there is an RRC reconfiguration process during each TP change.

Optionally, in an embodiment, to reduce an interrupt latency of user-plane data transmission in a change process, data to be sent to UE may be pre-stored in each TP. When a TP set used for transmitting data of the UE changes, the UE completes a related reconfiguration process based on a network configuration, for example, a reconfiguration process of at least one protocol layer of an RRC layer, a PDCP layer, a radio link control (Radio Link Control, RLC) layer, a MAC layer, and a PHY layer, and sends an instruction message of currently buffered data to a network. The instruction message may be sent using at least one of the following messages or signaling: a service request message, reconfiguration complete signaling, and L2 signaling, or may be sent by using an uplink physical control channel and a data channel. The instruction message may carry a current data buffer status, for example, an identifier of a protocol layer (the protocol layer may be at least one of the protocol layers such as the RRC layer, the PDCP layer, the RLC layer, the MAC layer, and the PHY layer) and HARQ information corresponding to data in the protocol layer, so that a new TP can uniquely identify the data based on the instruction message, and perform data transmission for the UE based on the corresponding HARQ information (including ACK or NACK information for the data). Using an example in which the UE updates only a number of a data receiving port or the UE only reconfigures a PHY protocol layer, the UE can send an instruction message to the network side, and add identification information of one or more of the PDCP layer, the RLC layer, and the MAC layer to the instruction message. The instruction message may further carry HARQ information, corresponding to the identification information, of data in a protocol layer. A new TP receives the instruction message and re-transmits the NACK information. Optionally, the new TP sends acknowledgment information to an original TP, to instruct the original TP to stop sending data to the UE.

412. The controller sends a no-cell configuration message to the UE by using a TP.

The no-cell configuration message may include a DUI of the UE. The UE may perform data transmission with the TP in the second TP set by using the DUI. Optionally, the no-cell configuration message includes information about the TP in the first TP set.

414. The hyper cell sends an initial context setup complete message to the controller.

416. The UE sends an uplink reference signal.

The location of the time-frequency resource for the uplink reference signal from the UE may be indicated by the no-cell configuration message in step 410. Optionally, in an embodiment, a correspondence between a dedicated user identity of the UE and the time-frequency resource for the uplink reference signal may be pre-established. The UE may determine, based on the correspondence, the time-frequency resource for sending the uplink reference signal.

In an embodiment, the uplink reference signal may be an SRS. In an embodiment, the uplink reference signal may be periodically sent, or may be sent after the UE moves a distance, where the distance may be configured by the network, or may be sent by combining the foregoing two sending manners, that is, the uplink reference signal is sent after it is detected that the UE moves a specified distance, and is also sent after a period expires.

418 and 420. A TP in the first TP set measures the uplink reference signal sent by the UE, and reports a measurement report to the controller.

Based on a measurement report reported by the TP in the first TP set or the second TP set, the controller may continuously adjust or update the second TP set (or continuously adjust or update a member of the second TP set, for example, add another TP to the second TP set, or delete a member from the second TP set). In an embodiment, the controller may alternatively continuously adjust or update the first TP set (or continuously adjust or update a member of the first TP set, for example, add another TP to the first TP set, or delete a member from the first TP set).

Specifically, when the uplink reference signal from the UE measured by a TP in the second TP set is weakened, for example, strength of the measured uplink reference signal is lower than a threshold, the TP may be deleted from the second TP set; when a TP in the first TP set does not detect an uplink reference signal (or strength of the detected uplink reference signal is lower than a specified threshold) and meets a specified condition (for example, a TP layer surrounding the UE also does not detect an uplink reference signal from the UE or the detected uplink reference signal is lower than a specified threshold), the TP may be deleted from the first TP set; when a TP in the first TP set measures the uplink reference signal from the UE (or the measured uplink reference signal from the UE is higher than a threshold), a TP layer surrounding the UE may be added to the first TP set; when a TP in the first TP set measures the uplink reference signal from the UE and signal strength is high enough (that is, when the measured uplink reference signal from the UE is higher than a configured or specified threshold, or when the measured uplink reference signal from the UE is compared, one by one, with differences or absolute differences between measurement results reported by TPs in the second TP set or with an average measurement result of measurement results reported by TPs in the second TP set, where the differences or absolute differences are less than a threshold), the TPs may be added to the second TP set. Optionally, the controller may notify, by using at least one of the following information or signaling: RRC signaling, L1 signaling, L2 signaling, and DCI, the UE of the TP added to the second TP set.

The foregoing describes that the UE can change between the power saving state and the activated state. To ensure that the UE can quickly change from the power saving state to the activated state, when the UE enters the power saving state (in the power saving state, or during sending of a paging message), a dedicated or shared uplink resource or dedicated or shared uplink resources (the uplink resource may be an UL grant, or may be an uplink resource used to bear a scheduling request (SR), an SRS, a preamble, or the like) that is or are corresponding to one or more TPs or that is valid in an entire hyper cell may be configured for the UE in the power saving state. Optionally, in an embodiment, a timing advance (TA) calculation rule or a specific TA value may be further configured for the UE, so that the UE can send uplink data in a timely manner, or indicate, in a timely manner, that the UE needs to send uplink data, or respond to a paging message in a timely manner, and can further quickly enter an activated state of uplink synchronization (or referred to as an RRC connected state). In addition, if the hyper cell has coverage of a macro station, the paging message may be sent or the TA value may be provided, by using the macro station.

It can be learned, from the foregoing description, that the UE in the power saving state reserves the DUI of the UE, and configures an uplink resource for the UE (optionally, configures a TA value or a TA value calculation rule for the UE), with no need to obtain a C-RNTI and an uplink resource by using a random access process and an RRC connection setup process in the current system. Therefore, the UE can quickly enter a system. It should be noted that the uplink resource of the UE may be configured in a plurality of manners, and the TA value may be determined in a plurality of manners. In the following, MO and MT are used as an example for detailed description. However, it should be understood that two cases of MO and MT are intended for ease of understanding. Actually, an uplink resource configuration manner and a TA value determining manner in the two cases of MO and MT may be combined with each other. Specific description is as follows.

MO: When UE in a power saving state needs to transmit uplink data, the UE may perform access by using a preconfigured uplink shared resource or a preconfigured uplink dedicated resource, for example, transmit an uplink access request or directly transmit the uplink data, and a network may also allocate a dedicated uplink/downlink resource for the UE accordingly, so that the UE quickly changes from the power saving state to an activated state.

MT: When a network side needs to send downlink data to UE in a power saving state, the network side may directly add an uplink shared resource or an uplink dedicated resource to a paging message, where these resources may be used by the UE to perform access, and after the UE performs access, the network side allocate a dedicated uplink/downlink resource for the UE accordingly, so that the UE quickly changes from the power saving state to an activated state. Optionally, in an embodiment, to reduce a paging message size, a network side may send in advance a mapping table including an uplink resource and an index of the uplink resource to UE, where a paging message carries only the index of the uplink resource to the UE, and the UE can determine the uplink resource based on the mapping table and the index.

In the cases of MO and MT, to quickly re-enter a system, the UE needs to obtain the uplink resource, and further needs to perform uplink synchronization with the network side, that is, needs to determine a TA (timing advance) value. The following details optional manners of obtaining the uplink resource and the TA value.

An uplink resource obtaining manner may be as follows.

Optionally, in an embodiment, in an MT scenario, an UL grant for one or more TPs in a hyper cell may be carried in the paging message, for use by the UE.

Optionally, in an embodiment, in an MT scenario, a macro station in a hyper cell may send a paging message, and an UL grant for one or more TPs may be carried in the paging message, for use by the UE.

Optionally, in an embodiment, in an MO scenario, the UE may be informed of an SR shared resource (the shared SR resource may be valid in an entire hyper cell) of each TP in the hyper cell). When the UE needs to send uplink data, a shared SR is selected to send a signal or a sequence corresponding to a DUI of the UE.

A manner of obtaining or determining a TA value used for uplink synchronization may be as follows.

Optionally, in an embodiment, in an MT scenario, when a network delivers a paging message, a TA may be or may not be carried in the paging message. If the TA is carried in the paging message, calculating the TA by the network side is required. Specific methods may be as follows.

1. A TA value used by the UE last time is directly used.
2. The network side sends an indication to inform the UE that, for example, a specific TA value of the following TA values is used to perform uplink synchronization: a TA value carried in the paging message, a TA value obtained by using an initial access procedure, a TA value reserved by the UE (for example, a TA value reserved when the UE enters a power saving state), and the like.

Optionally, in an embodiment, in an MO scenario, the UE may use one or more of the following manners to determine a TA value:

i. performing an initial access procedure;
ii. if UE has a TA value (for example, a TA value reserved when the UE enters the power saving state), the UE may directly use the TA value, or determine whether to use the TA value, for example, if it takes a short time for the UE to enter the power saving state, the UE continues to use the TA value, or after receiving the TA value, the TA value is valid within a predetermined time, and is invalid when the predetermined time expires; for another example, if it takes a long time for the UE to enter the power saving state, the UE no longer uses the TA value, and may obtain a new TA value by using the initial access procedure, that is, after a predetermined time expires, access a network by using a normal initial access procedure, to obtain the TA value; or the UE may determine whether to use the TA value based on a movement speed or a movement track, and if the movement speed is high, or the movement track is nearly straight, the TA value is used, otherwise, the TA value is not used; or a valid time of the TA value may be determined based on a movement speed or a movement track, and if the movement speed is high, or the movement track is nearly straight, a relatively short valid time of the TA value may be set, otherwise, a relatively long valid time of the TA value may be set; and iii. obtaining the TA value.

1. The TA value may be determined based on location information of the UE.

Specifically, the network side may collect, in advance, a TA value of a location of each TP in a hyper cell by using big data, and send a TA table including the information to the UE by using broadcast or dedicated signaling. The TA table may use, for example, the following form:

Local_1: Hyper Cell $TA_{10}$, $TP_1$ $TA_{11}$, $TP_2$ $TA_{12}$, ...

Local_2: Hyper Cell $TA_{20}$, $TP_1$ $TA_{21}$, $TP_2$ $TA_{22}$, ...

Local_3: Hyper Cell $TA_{30}$, $TP_1$ $TA_{31}$, $TP_2$ $TA_{32}$, ...

...

Local_n: Hyper Cell $TA_{n0}$, $TP_1$ $TA_{n1}$, $TP_2$ $TA_{n2}$, ...

The UE may always reserve the TA table in the hyper cell. When moving to a new location, the UE can search the table with reference to the current location of the UE to approximately obtain a TA value of each TP, and then use a corresponding TA value when sending uplink data or signaling. For example, when the UE needs to send the uplink data or signaling at the TP2 at a location 1 (marked as Local_1), the UE may use the TA12; when the UE moves to a location 3 (Local_3) and needs to send uplink data or signaling at the TP1, the UE uses the TA31.

2. The UE determines a TA value based on signal strength of a TP.

Specifically, the network side may collect, in advance, signal strength of a location of each TP in an area of a hyper cell and a corresponding TA value by using big data. Certainly, for each mapping, all TPs in a range of the entire hyper cell does not necessarily need to be listed, and only signal strength of a TP in the first TP set (that is, several TPs with a relatively strong signal surrounding the UE) for the UE and a corresponding TA value may be listed.

For example, a combination of signal strength of a plurality of TPs may be listed, and a TA value of each TP may be provided as follows in terms of each combination: {{RFStrengTP1, RFStrengTP2, . . . , RFStrengTPn}→ {Hyper Cell TA10, TP1 TA11, TP2 TA12, . . . }}.

Then, based on TP signal strength measured by the UE, the TA value of each TP may be obtained approximately by using the foregoing mapping. For example, when the UE is at the location 1, signal strength of first several TPs with relatively strong signals is {RFStrengTP1, RFStrengTP2, . . . , RFStrengTPn}; TAs {Hyper Cell TA10, TP1 TA11, TP2 TA12, . . . } of all TPs may be obtained approximately based on the set.

The foregoing details a plurality of optional manners of obtaining the uplink resource and the TA value. The following details, with reference to FIG. 6 to FIG. 8, a procedure in which UE quickly enters a system in MT and MO scenarios.

Figure 6:
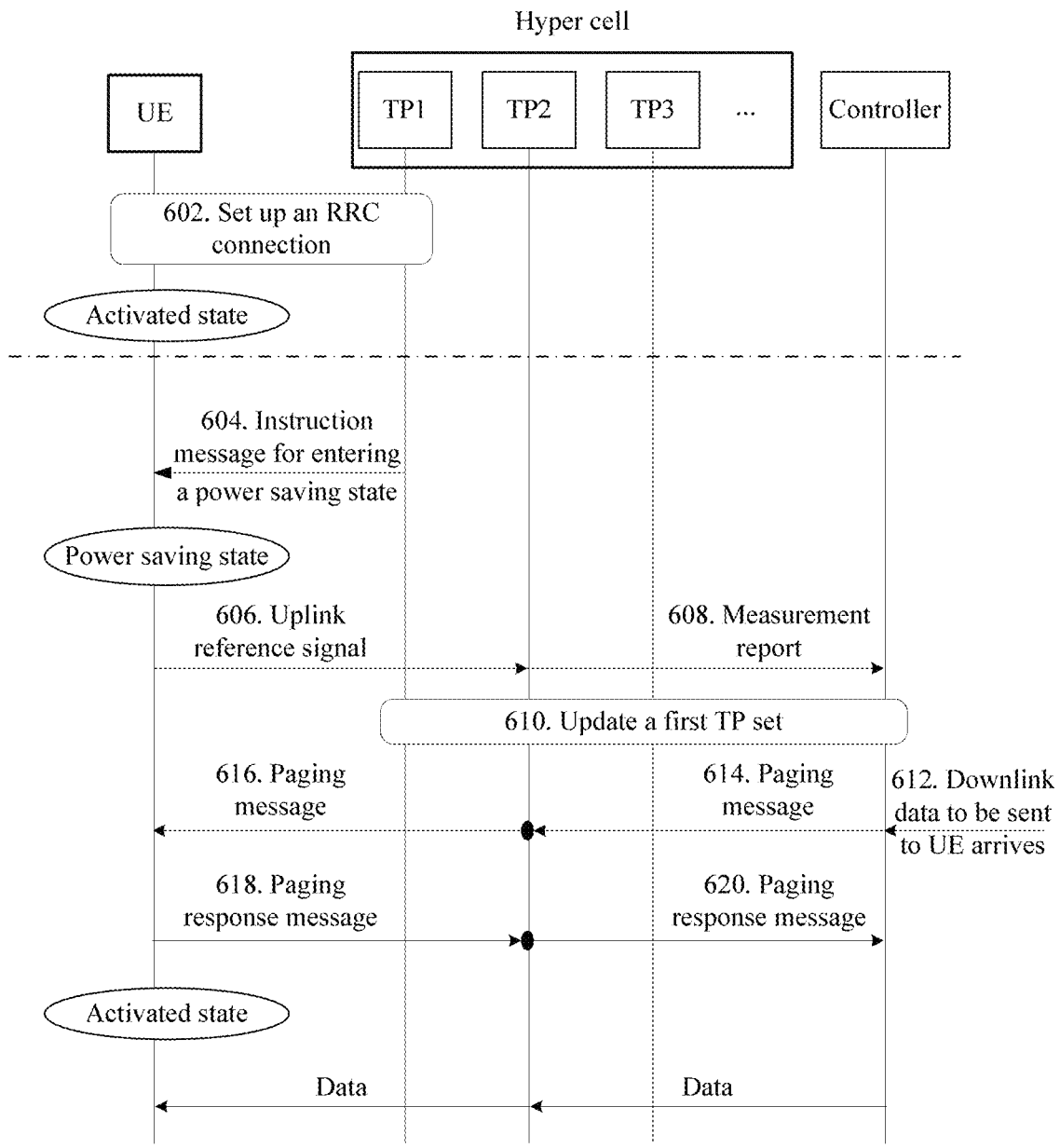
FIG. 6 is a schematic flowchart of quickly entering a system by UE in an MT scenario.

FIG. 6 is a schematic flowchart of quickly entering a system by UE in an MT scenario. It should be understood that communication steps or operations shown in FIG. 6 are merely an example. In an embodiment of the present invention, other operations or variations of operations in FIG. 6 may be further performed. In addition, steps in FIG. 6 may be performed in a sequence different from that presented in FIG. 6, and possibly not all operations in FIG. 6 need to be performed.

602. UE sets up an RRC connection to a TP in a hyper cell, and enters an activated state.

604. The UE receives an instruction message for entering a power saving state that is sent by a network side.

For example, when the UE has infrequent services or almost has no service, a network may instruct the UE to enter the power saving state. Optionally, the instruction message may carry a configuration parameter of the power saving state. Specifically, the configuration parameter may include one or more of the following parameters.

Parameter 1: a parameter indicating a paging occasion of the UE.

The paging occasion may refer to a parameter such as a time-frequency resource used by the UE to receive a paging message or send a paging response message. In an embodiment, a parameter related to the paging occasion may be associated with a DUI of the UE in a hyper cell, that is, the UE may determine the paging occasion based on a dedicated user equipment identity.

Parameter 2: a parameter used by the UE for quick recovery (or quickly entering an activated state or quickly entering a system).

The parameter may indicate an uplink resource preconfigured for the UE, for example, an SR, a PUSCH, or an uplink contention resource. In an embodiment, a parameter used by the UE to quickly enter a connected state may also be associated with the DUI of the UE. The UE may determine, based on the DUI of the UE and the association relationship, an uplink resource allocated for the UE, and quickly enter the connected state by using the uplink resource, with no need to perform a complex RRC connection setup process.

Parameter 3: a TA related configuration parameter.

For example, the TA related configuration parameter may be an initial TA value. The UE may perform uplink synchronization based on the initial TA value, and after entering the activated state, the UE may send uplink data by using the initial TA value.

606. The UE that has entered the power saving state sends an uplink reference signal.

Specifically, the UE in the power saving state may continue to reserve the DUI of the UE, continue to send the uplink reference signal, and listen to a paging message. TP frequency bands in a same hyper cell or in different hyper cells may differ. Therefore, in an embodiment, based on a principle that a network is transparent to UE as much as possible, two anchor frequency bands may be introduced.

Anchor frequency band 1: is used by the UE to receive paging message, perform downlink synchronization, and/or the like; and herein, for ease of description, is referred to as a paging (paging) frequency band (or referred to as a downlink synchronization band).

Anchor frequency band 2: is used by the UE to send an uplink reference signal, where a same frequency band can be monitored by TPs in different frequency bands; and herein, for ease of description, is referred to as a reference signal frequency band.

The two frequency bands may "remain unchanged". For example, the two frequency bands may be used throughout the entire network, regardless of wherever the UE in the network moves. Alternatively, the two frequency bands may be fixed in a specified range. For example, in a no-cell mode, the network sends configuration information of anchor frequency bands to the UE. An advantage brought by introduction of the anchor frequency bands is that, the UE does not need to care about a frequency band of a surrounding network even when the UE moves, and the UE only needs to do two things: One is to listen to whether the UE has its own paging in a "fixed" paging frequency band, or optionally, to perform downlink synchronization based on a paging frequency band, so as to send the paging message in a reference signal frequency band; the other is to send an uplink reference signal in a "fixed" reference signal frequency band. It should be noted that the mechanism of the anchor frequency bands is also applicable to communication between the UE in the connected state and the network. A manner of sending the uplink reference signal by the user equipment in the power saving state may be: periodically sending the uplink reference signal, or sending the uplink reference signal after it is detected that the UE moves a specified distance, so as to save power; or a combination thereof, that is, sending the uplink reference signal after it is detected that the UE moves a specified distance, and sending the uplink reference signal after a period expires.

608 and 610. A TP in a first TP set sends, to a controller, a measurement report for the uplink reference signal from the UE, and the controller continuously adjusts or updates the TP in the first TP set based on the measurement report.

For example, when a TP in the first TP set does not detect an uplink reference signal sent by the UE and meets a specified condition, for example, a TP layer surrounding the TP also does not detect an uplink reference signal, the TP may be deleted from the first TP set. For another example, when a TP in the first TP set detects the uplink reference signal sent by the UE, a TP layer surrounding the TP may alternatively be added to the first TP set.

612. The controller receives data to be sent to the UE.

614 and 616. The controller sends a paging message to the UE by using a TP.

Specifically, the controller may select one or more TPs with better signal quality from the first TP set, and send a paging message to the UE in a paging frequency band by using the TP or TPs. The paging message may carry an identity of the UE. Optionally, in an embodiment, an uplink resource used by the UE to quickly enter the connected state may be carried in the paging message. Optionally, in an embodiment, when a relatively small amount of downlink data is sent, the downlink data may be directly sent to the UE by using a paging message, and the UE does not need to enter the connected state. This can prevent the UE from frequently changing between the activated state and the power saving state.

For example, the paging message may carry an UL grant. A format of the paging message carrying the UL grant may be as follows:

the paging message includes pagingRecordList and a maximum of N pagingRecords, where

```
pagingRecord ::= SEQUENCE
{
    ue-Identity      pagingUE-Identity,   indicates a UE identity, that is,
which UE is to be paged
    UL grant         a newly added field: indicates an UL grant
    configured for the UE
    ...
}
```

618 and 620. The UE sends a paging response message to the controller on a preconfigured uplink resource by using a TP.

As described above, the preconfigured uplink resource may be indicated by the instruction information in step 604, may be associated with the DUI of the UE, or may be indicated by the paging message in steps 614 and 616. This is not specifically limited in this embodiment of the present invention. The UE sends the paging response message by using the pre-allocated uplink resource, with no need to initiate an RRC connection setup process to quickly enter the activated state.

Figure 7:
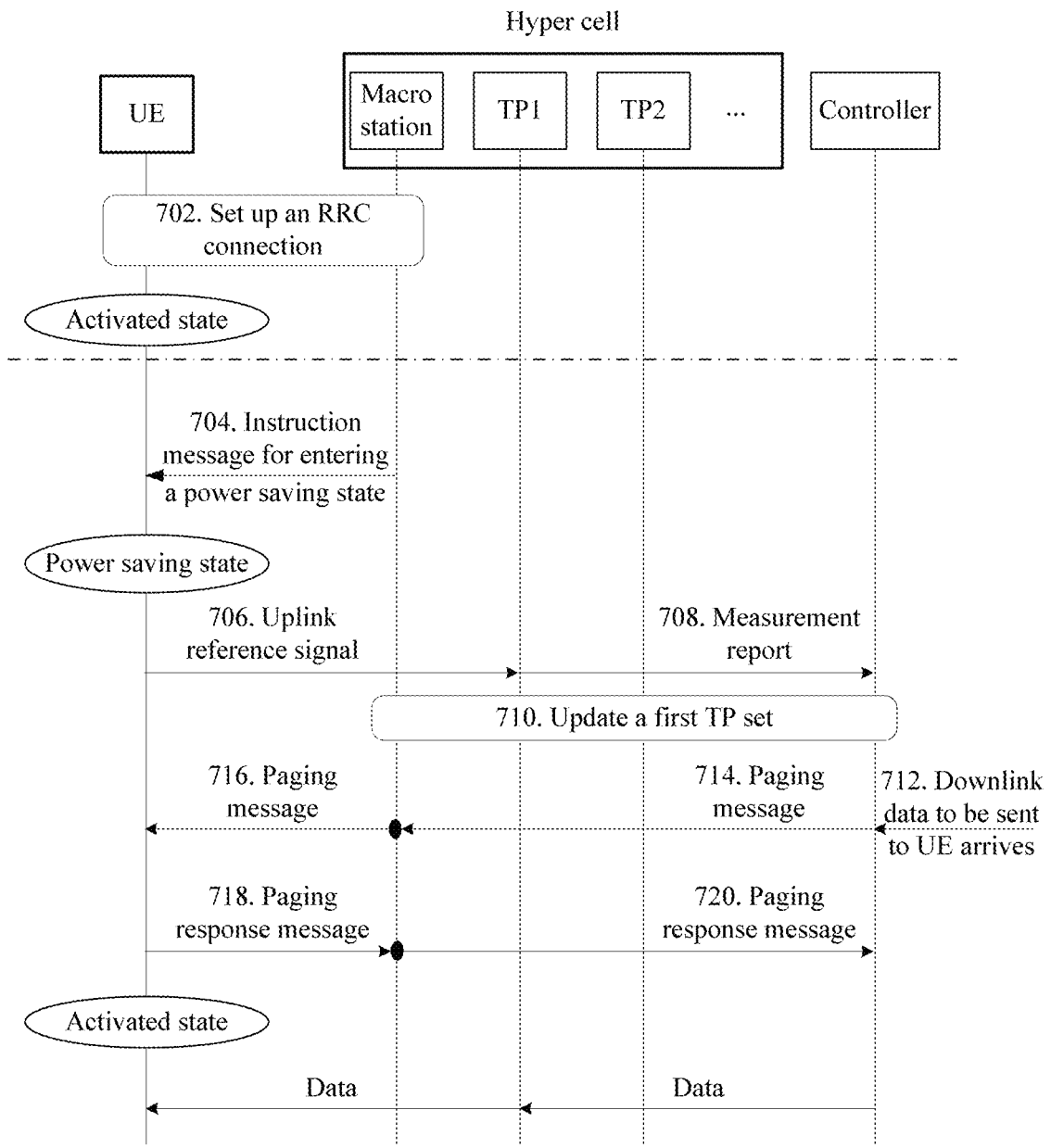
FIG. 7 is another schematic flowchart of quickly entering a system by UE in an MT scenario.

FIG. 7 is another schematic flowchart of quickly entering a system by UE in an MT scenario. FIG. 7 mainly differs from FIG. 6 in that, in FIG. 7, when there is coverage of a macro station in a hyper cell, a controller may send a paging message to UE by using the macro station. The macro station may be understood as a TP in the hyper cell. Different from another TP (for example, a pico base station), the macro station is always available. Steps and operations in FIG. 7 are similar to those in FIG. 6. To avoid repetition, details are not described herein again.

Figure 8:
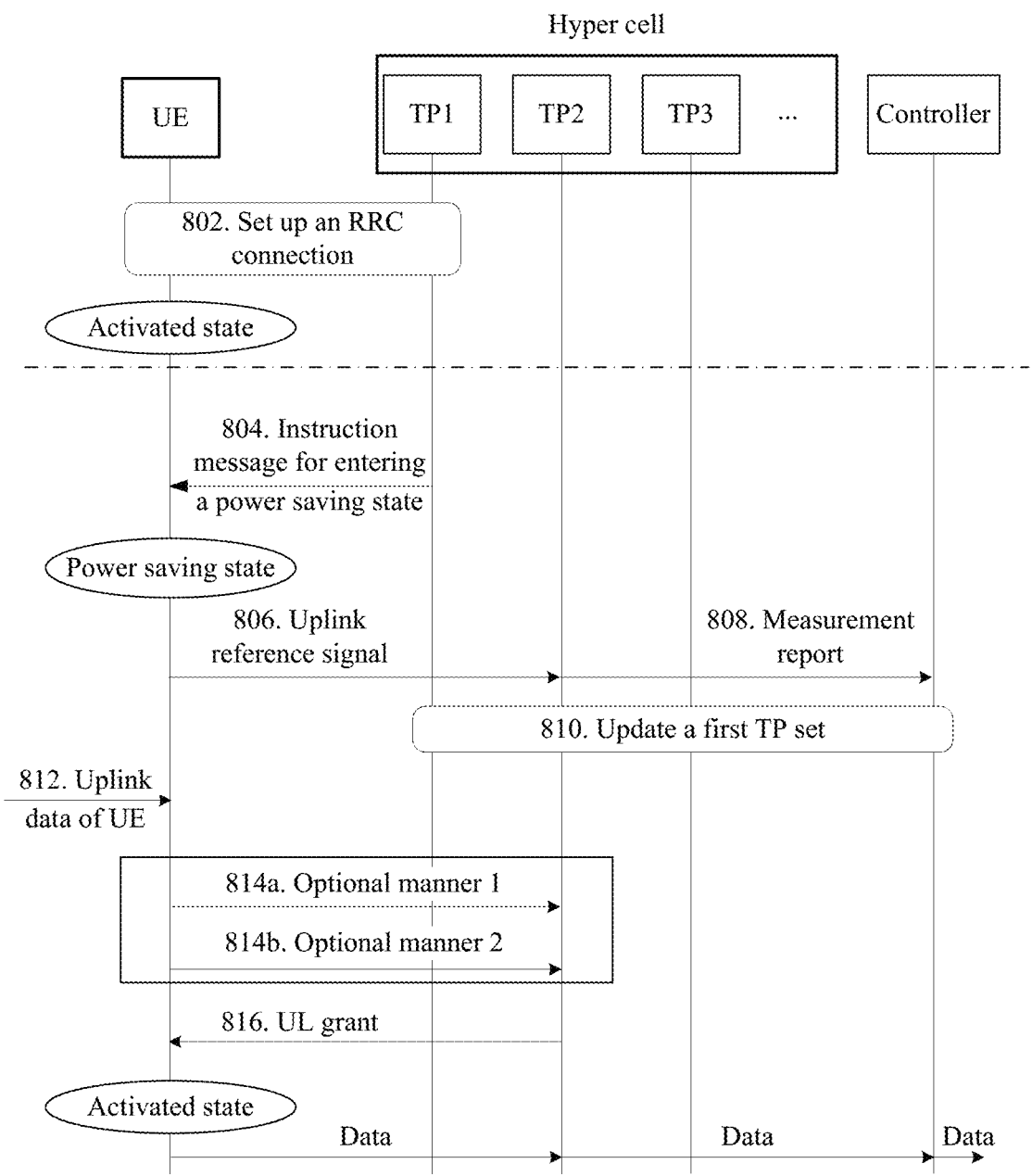
FIG. 8 is a schematic flowchart of quickly entering a system by UE in an MO scenario.

FIG. 8 is a schematic flowchart of quickly entering a system by UE in an MO scenario. It should be understood that communication steps or operations shown in FIG. 8 are merely an example. In an embodiment of the present invention, other operations or variations of operations in FIG. 8 may be further performed. In addition, steps in FIG. 8 may be performed in a sequence different from that presented in FIG. 8, and possibly not all operations in FIG. 8 need to be performed.

Steps 802 to 810 are similar to steps 602 to 610. To avoid repetition, details are not described herein again.

812. The UE has to-be-sent uplink data.

For example, the UE receives an indication that data arrives at the UE.

814a. The UE directly sends the data by using a previously preconfigured uplink resource.

Specifically, the UE may directly send the data on the preconfigured uplink resource based on a DUI of the UE. The uplink resource may be a shared PUSCH.

814b. The UE sends an SR to a network side by using the previously preconfigured uplink resource, the network side allocates a dedicated UL grant to the UE, and the UE enters an activated state after obtaining the dedicated UL grant, to continue to send the uplink data.

816. The TP allocates an UL grant to the UE for data transmission of the UE.

It can be learned from above that the preconfigured uplink resource includes a dedicated or shared SR resource, a dedicated or shared PUSCH resource, or the like. The pre-allocated resource may be a resource indicated in a dedicated message (for example, the message sent in step 804), or a resource indicated in a broadcast message. This is not specifically limited in this embodiment of the present invention.

In the foregoing, regardless of using an MT or MO scenario, when data transmission needs to be performed between UE and a controller, the UE in a power saving state uses a preconfigured resource to quickly enter an activated state, to perform data transmission with the controller. It should be understood that no limitation is imposed thereon in this embodiment of the present invention. The UE may maintain in the power saving state and perform uplink and downlink data transmission with the controller in the power saving state. For example, when a relatively large amount of data needs to be transmitted between the UE and the controller (for example, a volume of the to-be-transmitted data is greater than a preset threshold), the UE may perform data transmission in the foregoing manner of entering the activated state from the power saving state; and when a relatively small amount of data needs to be transmitted between the UE and the controller (for example, a volume of the to-be-transmitted data is less than the preset threshold), the UE maintains in the power saving state, and performs data transmission with the controller. A data transmission mode in which the UE maintains in the power saving state may be still considered as a manner in which the UE quickly enters a system without initiating a complex RRC connection setup procedure. The following provides detailed descriptions with reference to FIG. 9 and FIG. 10.

Figure 9:
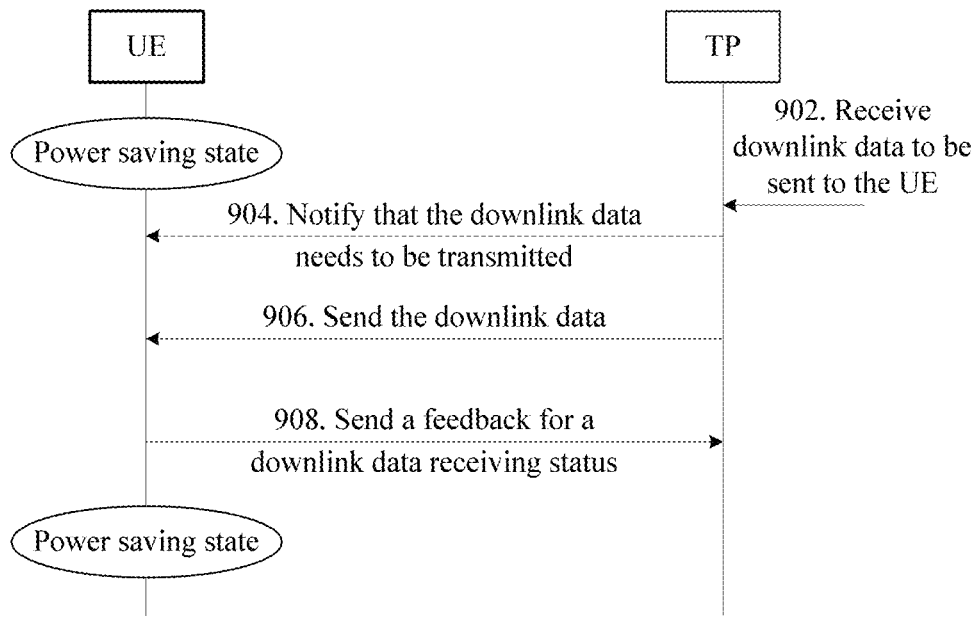
FIG. 9 is a schematic flowchart of a method for receiving, in an MT scenario, downlink data from a network side by UE that maintains in a power saving state.

FIG. 9 is a schematic flowchart of a method for receiving, in an MT scenario, downlink data from a network side by UE that maintains in a power saving state. The method in FIG. 9 includes the following steps.

902. A network side receives downlink data to be sent to UE.

It should be understood that the network side herein may be a TP, or may be a controller. For example, the controller may receive the downlink data to be sent to the UE, and then a TP in a hyper cell performs communication and data transmission with the UE.

904. The network side notifies the UE that there is the to-be-sent downlink data (specifically, the UE may be notified in a Per UE mode, that is, each UE in a power saving state is corresponding to a downlink resource block, and the following details the Per UE mode).

It should be understood that this step is an optional step. The network side may alternatively send the downlink data to the UE directly. This notification may carry a DUI of the UE and instruction information that downlink data needs to be transmitted.

Specifically, the UE may be notified, in one of the following manners, that there is to-be-sent downlink data:

by using a notification; and
by using a PDCCH.

In addition, a location of a resource for subsequently sending the downlink data may be further indicated. The resource location may include:

a time interval, for example, sending is performed after a specific quantity of transmission time intervals (TTI); and
a receive window, including a start location and a size of the window.

Further, decoding information of a resource for subsequently sending the downlink data may be further indicated. The decoding information may be one of the following:

detailed decoding information, for example, downlink control information (DCI), where many resources are required, for example, relatively many PDCCH resources are occupied;
some decoding information, for example, a modulation and coding scheme (MCS), where a few resources are required, for example, a few PDCCH resources are occupied; or
merely an indication indicating that data is to be sent subsequently.

906. The network side sends the downlink data to the UE.

Optionally, in an embodiment, the downlink data may be sent by using a grant-free resource, for example, a grant-free PDSCH channel; or the downlink data may be directly sent over a dedicated notification channel. Specifically, the following manners may be used to send the downlink data.

When the downlink data is sent by using the grant-free resource, the following several cases may be discussed.

if step 904 is not performed (that is, the UE is not notified in advance that downlink data needs to be sent),
a Per Group mode may be used, that is, performing receiving by using a resource allocated based on a group, for example, periodic receiving, where the Per Group mode is detailed in the following; or
if step 904 is performed,
a Per Cell mode may be used, that is, a shared resource block is allocated for all UEs in a power saving state that are in a hyper cell,
there is a fixed timing relationship between an indication resource and a data delivery resource, for example, a specific time interval, or
a specific location of a data delivery resource is directly provided, and there is no fixed relationship between the specific location and an indication resource.

908. Send a feedback (or referred to as an uplink response) for a downlink data receiving status.

The uplink response may include a DUI of the UE, or may include instruction information of the downlink data receiving status, for example, an ACK. A channel or resource that can be used by the uplink response may include:

a grant-free resource
a tracking channel resource
PUCCH channels (which may be in one-to-one correspondence with grant-free resources, that is, there is a corresponding PUCCH resource when a grant-free resource is used, the resource is not dedicated for the UE, but the network side can know, based on UE to which downlink data is sent, which UE sends uplink data).

Figure 10:
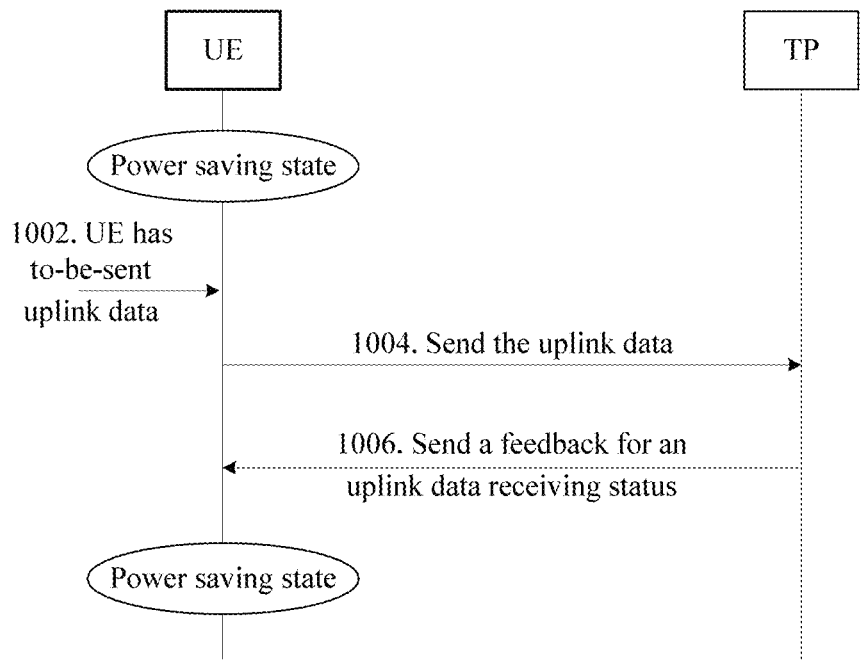
FIG. 10 is a schematic flowchart of a method for sending, in an MO scenario, uplink data to a network side by UE that maintains in a power saving state.

FIG. 10 is a schematic flowchart of a method for sending, in an MO scenario, uplink data to a network side by UE that maintains in a power saving state. The method in FIG. 10 includes the following steps.

1002. The UE determines that there is to-be-sent uplink data.

1004. The UE sends the uplink data to a network side.

It should be understood that the network side herein may be a TP, or may be a controller. For example, the UE may perform communication and data transmission with a controller by using a TP in a hyper cell. The UE may transmit uplink data based on a DUI by using a grant-free resource, for example, a grant-free PUSCH resource. In addition, it is recommended to use a Per Group mode to perform periodic receiving, and the network side decodes UE in a group. This can reduce hardware costs.

1006. The network side sends a feedback (or referred to as a downlink response) specific to an uplink data receiving status to the UE.

The downlink response may include information such as an ACK or a NACK. In addition, the network side may send a downlink response to the UE by using a notification channel, or may send a downlink response to the UE by using a grant-free resource, for example, send a feedback to the UE by using a grant-free PDSCH resource. For example, the network side may send a downlink response by using a grant-free resource. In a process of sending the downlink response, the network side may select an idle PDSCH resource for sending. Certainly, the network side may respond to several uplink data sendings at the same time, and if scheduling resources are not enough to complete scheduling, no response is sent. In addition, a Per Cell mode may be used to send the downlink response.

In addition, in processes described in FIG. 9 and FIG. 10, the UE may use one or more of Per Cell, Per UE, and Per Group resource reusing manners. The following details a similarity and a difference between the several resource reusing manners.

In a Per Cell manner, a resource is shared by all UEs in a power saving state in an entire cell, and UE can use the resource immediately. In this way, a sending latency of the UE is relatively short, but there is a conflict between UEs. Specifically, in an uplink direction, because the network side is unaware which UE performs sending, all UEs need to be decoded blindly, and a relatively high hardware processing capability is required; in a downlink direction, UE needs to continue listening, and after decoding succeeds, needs to determine whether data is sent to the UE itself, and discards the data if the data is not sent to the UE itself. Considering that continuing listening consumes more power, a window may be allocated for the UE; in this case, the UE only needs to continue to listen to the specified window.

In a Per UE mode, resources have been distinguished for UEs, for example, different UEs use different time-frequency resources, that is, even if UEs use a same time-frequency resource, the UEs can be allowed to use different code resources, so as to distinguish between UEs. In uplink, UE may directly use the resource to send data without causing a conflict with other UE; in downlink, the UE may directly perform decoding and receiving.

In a Per Group mode, all UEs in a power saving state belong to different groups, each group has a dedicated resource, for example, a resource is periodically allocated for a group. In uplink, UE uses a resource for a group to which the UE belongs to perform transmission, and the network side needs to decode all UEs in the group corresponding to the resource; in downlink, the network uses a resource corresponding to a group to which the UE belongs, to deliver data, and the UE only decodes the resource corresponding to the group to which the UE itself belongs. This mode may be considered as a compromise of the Per UE mode and the Per Cell mode.

The foregoing details, with reference to FIG. 1 to FIG. 10, a communication method applied to a hyper cell according to the embodiments of the present invention. The following details, with reference to FIG. 11 to FIG. 14, UE and a controller according to embodiments of the present invention.

Figure 11:
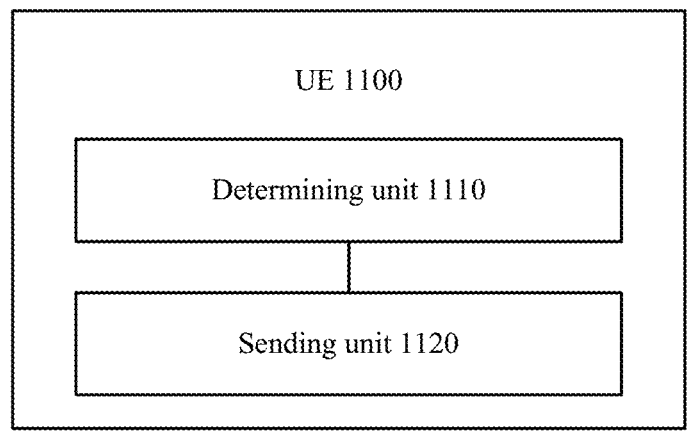
FIG. 11 is a schematic block diagram of UE according to an embodiment of the present invention.

FIG. 11 is a schematic structural diagram of UE according to an embodiment of the present invention. It should be understood that the UE 1100 in FIG. 11 can implement each step in FIG. 1 to FIG. 10 performed by the UE. To avoid repetition, details are not described herein again. The UE 1100 is UE in a power saving state that is in a hyper cell. The UE 1100 includes: a determining unit 1110, configured to determine that there is to-be-sent uplink data, where the hyper cell includes a plurality of transmission points TPs, the hyper cell identifies the UE 1100 by using a dedicated user equipment identity DUI, and the UE 1100 in the power saving state reserves the DUI; and a sending unit 1120, configured to: after the determining unit 1110 determines that there is the to-be-sent uplink data, send an uplink instruction message to a radio access network controller or a core network controller based on the DUI by using a preconfigured uplink resource, where the uplink instruction message is used to instruct the UE 1100 to enter an activated state; and send the uplink data to the controller after the UE 1100 enters the activated state.

In this embodiment of the present invention, a DUI of UE in an idle state is reserved, and an uplink resource or a downlink resource is preconfigured for the UE in the power saving state, so that the UE can quickly enter the activated state, with no need to perform a complex RRC connection setup process.

Optionally, in an embodiment, the sending unit 1120 is further configured to send some data of the uplink data by using the uplink resource; and the sending unit 1120 is specifically configured to: after the UE 1100 enters the activated state, send remaining data of the uplink data except the some data to the controller.

Optionally, in an embodiment, the uplink instruction message is a scheduling request message or a buffer status report.

Optionally, in an embodiment, the uplink resource is a grant-free uplink resource, and the grant-free uplink resource is a shared uplink resource allocated for the UE 1100 in the power saving state.

Optionally, in an embodiment, the UE 1100 in the power saving state sends a tracking signal continuously in the hyper cell based on the DUI, and the UE 1100 sends the uplink instruction message by using the tracking signal.

Optionally, in an embodiment, the tracking signal sent by the UE 1100 includes a common tracking signal and a dedicated tracking signal, the UE 1100 implicitly sends the uplink instruction message by sending the dedicated tracking signal, and a time-frequency resource or code resource for the dedicated tracking signal is different from that for the common tracking signal.

Optionally, in an embodiment, the UE 1100 further includes: a receiving unit, configured to: when the controller prepares to send downlink data to the UE 1100 in the power saving state, receive a downlink instruction message from the controller by using a preconfigured downlink resource, where the downlink instruction message is used to instruct the UE 1100 to enter an activated state; the sending unit 1120 is further configured to send a response message for the downlink instruction message to the controller, where the response message is used to indicate that the UE 1100 has entered the activated state; and the receiving unit is further configured to receive the downlink data from the controller after the UE 1100 enters the activated state.

Optionally, in an embodiment, the receiving unit is further configured to receive some data of the downlink data from the controller by using the downlink resource; and the receiving unit is specifically configured to: after the UE 1100 enters the activated state, receive, from the controller, remaining data of the downlink data except the some data.

Optionally, in an embodiment, the downlink instruction message is a paging message, and the downlink resource is used to bear the paging message; or the downlink instruction message is a notification message, and the downlink resource is used to bear the notification message.

Optionally, in an embodiment, the downlink resource is a grant-free downlink resource, and the grant-free downlink resource is a shared downlink resource allocated for the UE 1100 in the power saving state.

Figure 12:
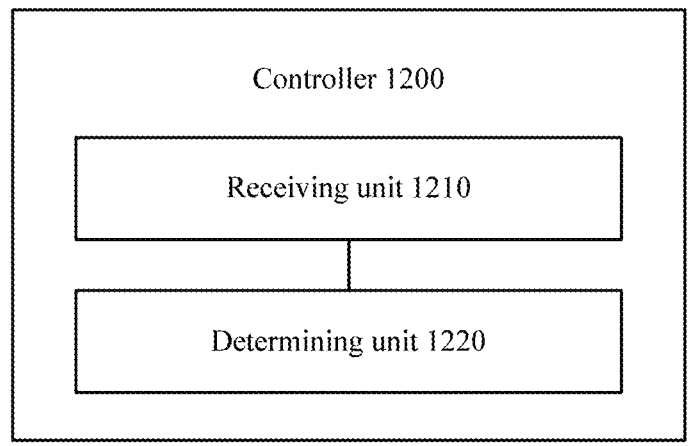
FIG. 12 is a schematic block diagram of a controller according to an embodiment of the present invention.

FIG. 12 is a schematic structural diagram of a controller 1200 according to an embodiment of the present invention. The controller 1200 in FIG. 12 is a radio access network controller or a core network controller. It should be understood that the controller 1200 can implement each step in FIG. 1 to FIG. 10 performed by the controller. To avoid repetition, details are not described herein again. The controller 1200 includes: a receiving unit 1210, configured to: when user equipment UE in a power saving state that is in a hyper cell has to-be-sent uplink data, receive an uplink instruction message from the UE, where the hyper cell includes a plurality of transmission points TPs, the hyper cell identifies the UE by using a dedicated user equipment identity DUI, the UE in the power saving state reserves the DUI, the uplink instruction message is sent by the UE based on the DUI by using a preconfigured uplink resource, and the uplink instruction message is used to indicate that the UE has entered an activated state; and a determining unit 1220, configured to determine, based on the uplink instruction message received by the receiving unit 1210, that the UE has entered the activated state.

The receiving unit 1210 is further configured to receive the uplink data from the UE in the activated state.

In this embodiment of the present invention, a DUI of UE in an idle state is reserved, and an uplink resource or a downlink resource is preconfigured for the UE in the power saving state, so that the UE can quickly enter the activated state, with no need to perform a complex RRC connection setup process.

Optionally, in an embodiment, the receiving unit 1210 is further configured to receive some data of the uplink data from the UE by using the uplink resource; and the receiving unit 1210 is specifically configured to receive, from the UE in the activated state, remaining data of the uplink data except the some data.

Optionally, in an embodiment, the uplink instruction message is a scheduling request message or a buffer status report.

Optionally, in an embodiment, the uplink resource is a grant-free uplink resource, and the grant-free uplink resource is a shared uplink resource allocated for the UE in the power saving state.

Optionally, in an embodiment, the UE in the power saving state sends a tracking signal continuously in the hyper cell based on the DUI, and the UE sends the uplink instruction message by using the tracking signal.

Optionally, in an embodiment, the tracking signal sent by the UE includes a common tracking signal and a dedicated tracking signal, the UE implicitly sends the uplink instruction message by sending the dedicated tracking signal, and a time-frequency resource or code resource for the dedicated tracking signal is different from that for the common tracking signal.

Optionally, in an embodiment, the tracking signal is sent by using a dedicated uplink notification channel, or the tracking signal is sent by using a dedicated time-frequency resource.

Optionally, in an embodiment, the receiving unit 1210 is further configured to receive downlink data from the UE in the power saving state; and the controller 1200 further includes: a sending unit, configured to send a downlink instruction message to the UE by using a preconfigured downlink resource, where the downlink instruction message is used to instruct the UE to enter an activated state; the receiving unit 1210 is further configured to receive, from the UE, a response message for the downlink instruction message, where the response message is used to indicate that the UE has entered the activated state; and the sending unit is further configured to send the downlink data to the UE in the activated state.

Optionally, in an embodiment, the sending unit is further configured to send some data of the downlink data to the UE by using the downlink resource; and the sending unit is specifically configured to send remaining data of the downlink data except the some data to the UE in the activated state.

Optionally, in an embodiment, the downlink resource is a grant-free downlink resource, and the grant-free downlink resource is a shared downlink resource allocated for the UE in the power saving state.

Figure 13:
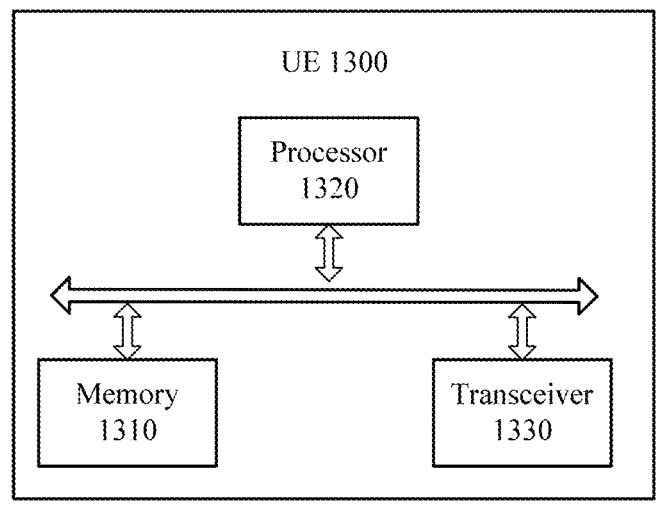
FIG. 13 is a schematic block diagram of UE according to an embodiment of the present invention.

FIG. 13 is a schematic structural diagram of UE according to an embodiment of the present invention. It should be understood that the UE 1300 in FIG. 13 can implement each step in FIG. 1 to FIG. 10 performed by the UE. To avoid repetition, details are not described herein again. The UE 1300 is UE in a power saving state that is in a hyper cell. The UE 1300 includes: a memory 1310, configured to store a program; a processor 1320, configured to: execute the program in the memory 1310, and when the program is executed, determine, by the processor 1320, that there is to-be-sent uplink data, where the hyper cell includes a plurality of transmission points TPs, the hyper cell identifies the UE 1300 by using a dedicated user equipment identity DUI, and the UE 1300 in the power saving state reserves the DUI; and a transceiver 1330, configured to: after the processor 1320 determines that there is the to-be-sent uplink data, send an uplink instruction message to a radio access network controller or a core network controller based on the DUI by using a preconfigured uplink resource, where the uplink instruction message is used to instruct the UE 1300 to enter an activated state; and send the uplink data to the controller after the UE 1300 enters the activated state.

In this embodiment of the present invention, a DUI of UE in an idle state is reserved, and an uplink resource or a downlink resource is preconfigured for the UE in the power saving state, so that the UE can quickly enter the activated state, with no need to perform a complex RRC connection setup process.

Optionally, in an embodiment, the transceiver 1330 is further configured to send some data of the uplink data by using the uplink resource; and the transceiver 1330 is specifically configured to: after the UE 1300 enters the activated state, send remaining data of the uplink data except the some data to the controller.

Optionally, in an embodiment, the uplink instruction message is a scheduling request message or a buffer status report.

Optionally, in an embodiment, the uplink resource is a grant-free uplink resource, and the grant-free uplink resource is a shared uplink resource allocated for the UE 1300 in the power saving state.

Optionally, in an embodiment, the UE 1300 in the power saving state sends a tracking signal continuously in the hyper cell based on the DUI, and the UE 1300 sends the uplink instruction message by using the tracking signal.

Optionally, in an embodiment, the tracking signal sent by the UE 1300 includes a common tracking signal and a dedicated tracking signal, the UE 1300 implicitly sends the uplink instruction message by sending the dedicated tracking signal, and a time-frequency resource or code resource for the dedicated tracking signal is different from that for the common tracking signal.

Optionally, in an embodiment, the transceiver 1330 is further configured to: when the controller prepares to send downlink data to the UE 1300 in the power saving state, receive a downlink instruction message from the controller by using a preconfigured downlink resource, where the downlink instruction message is used to instruct the UE 1300 to enter an activated state; send a response message for the downlink instruction message to the controller, where the response message is used to indicate that the UE 1300 has entered the activated state; and receive the downlink data from the controller after the UE 1300 enters the activated state.

Optionally, in an embodiment, the transceiver 1330 is further configured to receive some data of the downlink data from the controller by using the downlink resource; and the transceiver 1330 is specifically configured to: after the UE 1300 enters the activated state, receive, from the controller, remaining data of the downlink data except the some data.

Optionally, in an embodiment, the downlink instruction message is a paging message, and the downlink resource is used to bear the paging message; or the downlink instruction message is a notification message, and the downlink resource is used to bear the notification message.

Optionally, in an embodiment, the downlink resource is a grant-free downlink resource, and the grant-free downlink resource is a shared downlink resource allocated for the UE 1300 in the power saving state.

Figure 14:
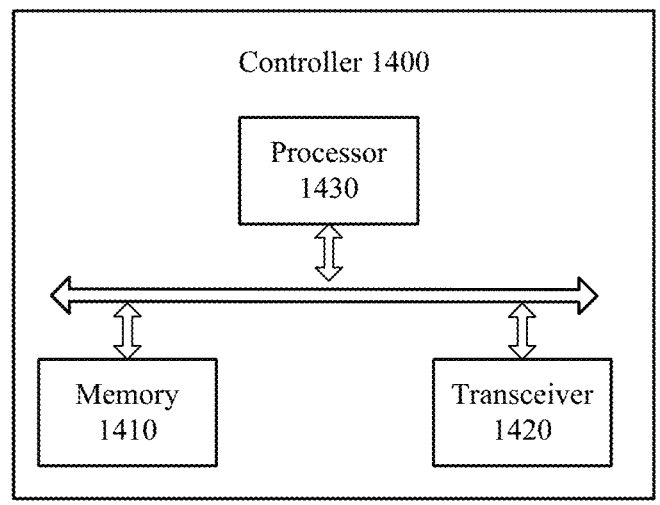
FIG. 14 is a schematic block diagram of a controller according to an embodiment of the present invention.

FIG. 14 is a schematic structural diagram of a controller 1400 according to an embodiment of the present invention. The controller 1400 in FIG. 14 is a radio access network controller or a core network controller. It should be understood that the controller 1400 can implement each step in FIG. 1 to FIG. 10 performed by the controller. To avoid repetition, details are not described herein again. The controller 1400 includes: a memory 1410, configured to store a program; a transceiver 1420, configured to: when user equipment UE in a power saving state that is in a hyper cell has to-be-sent uplink data, receive an uplink instruction message from the UE, where the hyper cell includes a plurality of transmission points TPs, the hyper cell identifies the UE by using a dedicated user equipment identity DUI, the UE in the power saving state reserves the DUI, the uplink instruction message is sent by the UE based on the DUI by using a preconfigured uplink resource, and the uplink instruction message is used to indicate that the UE has entered an activated state; and a processor 1430, configured to: execute the program stored in the memory 1410, and when the program is executed, determine, by the processor 1430 based on the uplink instruction message received by the transceiver 1420, that the UE has entered the activated state.

The transceiver 1420 is further configured to receive the uplink data from the UE in the activated state.

In this embodiment of the present invention, a DUI of UE in an idle state is reserved, and an uplink resource or a downlink resource is preconfigured for the UE in the power saving state, so that the UE can quickly enter the activated state, with no need to perform a complex RRC connection setup process.

Optionally, in an embodiment, the transceiver 1420 is further configured to receive some data of the uplink data from the UE by using the uplink resource; and the transceiver 1420 is specifically configured to receive, from the UE in the activated state, remaining data of the uplink data except the some data.

Optionally, in an embodiment, the uplink instruction message is a scheduling request message or a buffer status report.

Optionally, in an embodiment, the uplink resource is a grant-free uplink resource, and the grant-free uplink resource is a shared uplink resource allocated for the UE in the power saving state.

Optionally, in an embodiment, the UE in the power saving state sends a tracking signal continuously in the hyper cell based on the DUI, and the UE sends the uplink instruction message by using the tracking signal.

Optionally, in an embodiment, the tracking signal sent by the UE includes a common tracking signal and a dedicated tracking signal, the UE implicitly sends the uplink instruction message by sending the dedicated tracking signal, and a time-frequency resource or code resource for the dedicated tracking signal is different from that for the common tracking signal.

Optionally, in an embodiment, the tracking signal is sent by using a dedicated uplink notification channel, or the tracking signal is sent by using a dedicated time-frequency resource.

Optionally, in an embodiment, the transceiver 1420 is further configured to: receive downlink data from the UE in the power saving state; send a downlink instruction message to the UE by using a preconfigured downlink resource, where the downlink instruction message is used to instruct the UE to enter an activated state; receive, from the UE, a response message for the downlink instruction message, where the response message is used to indicate that the UE has entered the activated state; and send the downlink data to the UE in the activated state.

Optionally, in an embodiment, the transceiver 1420 is further configured to send some data of the downlink data to the UE by using the downlink resource; and the transceiver 1420 is specifically configured to send remaining data of the downlink data except the some data to the UE in the activated state.

Optionally, in an embodiment, the downlink resource is a grant-free downlink resource, and the grant-free downlink resource is a shared downlink resource allocated for the UE in the power saving state.

Figure 15:
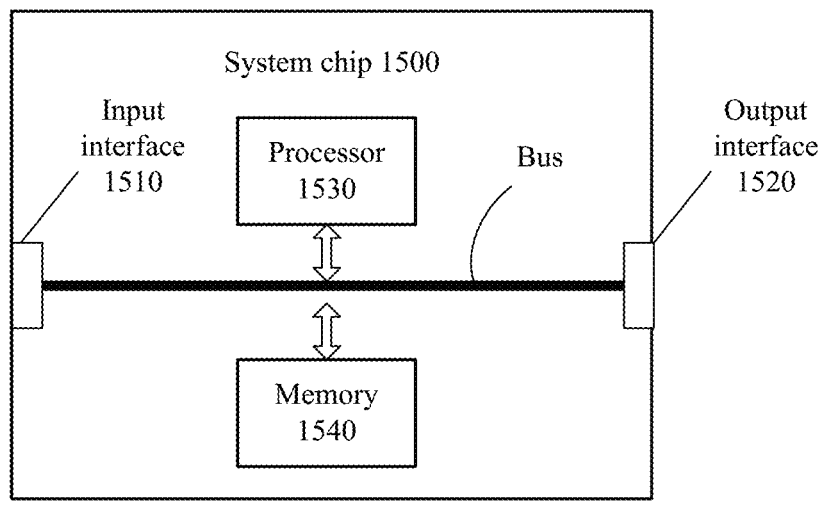
FIG. 15 is a schematic structural diagram of a system chip according to an embodiment of the present invention.

FIG. 15 is a schematic structural diagram of a system chip according to an embodiment of the present invention. The system chip 1500 in FIG. 15 includes an input interface 1510, an output interface 1520, at least one processor 1530, and a memory 1540. The input interface 1510, the output interface 1520, the processor 1530, and the memory 1540 are connected by using a bus, the processor 1530 is configured to execute code in the memory 1540, and when the code is executed, the processor 1530 implements the method in FIG. 1 to FIG. 10 performed by the UE.

Figure 16:
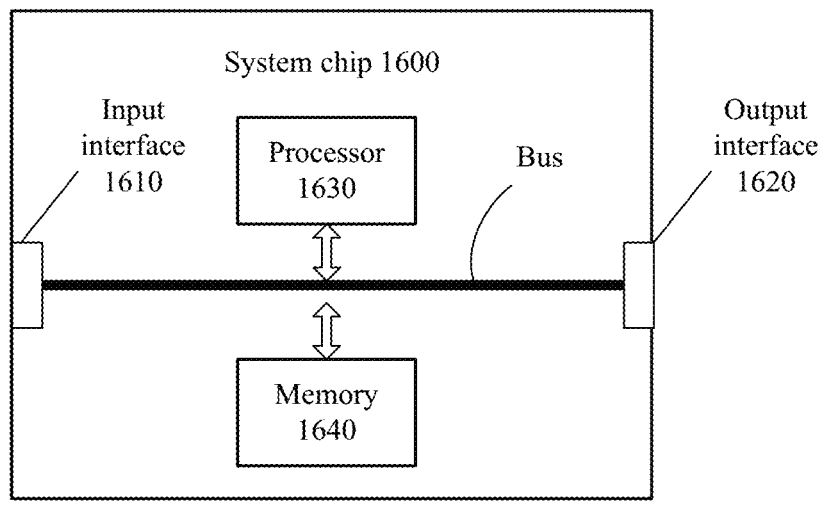
FIG. 16 is a schematic structural diagram of a system chip according to an embodiment of the present invention.

FIG. 16 is a schematic structural diagram of a system chip according to an embodiment of the present invention. The system chip 1600 in FIG. 16 includes an input interface 1610, an output interface 1620, at least one processor 1630, and a memory 1640. The input interface 1610, the output interface 1620, the processor 1630, and the memory 1640 are connected by using a bus, the processor 1630 is config-ured to execute code in the memory 1640, and when the code is executed, the processor 1630 implements the method in FIG. 1 to FIG. 10 performed by the controller.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    receiving, by a mobile device from a controller, an instruction message for entering a power saving state, the mobile device being in a hyper cell, wherein:
        the instruction message comprises a configuration parameter indicating a preconfigured uplink resource to be used by the mobile device while the mobile device is in the power saving state;
        the hyper cell comprises a plurality of transmission points (TPs);
        a dedicated user equipment identity (DUI) identifies the mobile device in the hyper cell; and
        the mobile device reserves the DUI when the mobile device is in the power saving state;
    determining, by the mobile device, that there is uplink data to be sent to the controller, wherein the mobile device is in the power saving state when the mobile device determines that there is to-be-sent uplink data;
    sending, by the mobile device, an uplink instruction message to the controller based on the DUI and using the preconfigured uplink resource, wherein the uplink instruction message indicates the mobile device will subsequently enter an activated state, wherein the mobile device, while in the power saving state, sends a tracking signal continuously in the hyper cell based on the DUI, and the mobile device sends the uplink instruction message using the tracking signal, wherein the tracking signal sent by the mobile device comprises a common tracking signal and a dedicated tracking signal, the mobile device sends the uplink instruction message by sending the dedicated tracking signal, and a time-frequency resource or a code resource that is allocated for sending the dedicated tracking signal is different from a time-frequency resource or a code resource that is allocated for sending the common tracking signal, and wherein the controller is a radio access network controller or a core network controller; and
    sending, by the mobile device in the activated state, the uplink data to the controller.

2. The method according to claim 1, further comprising:
    sending, by the mobile device, a portion of the uplink data using the preconfigured uplink resource, wherein the uplink data comprises the portion of the uplink data and remaining data of the uplink data; and
    wherein sending, by the mobile device in the activated state, the uplink data to the controller comprises:
        sending, by the mobile device in the activated state, the remaining data of the uplink data to the controller.

3. The method according to claim 1, wherein the uplink instruction message is a scheduling request message or a buffer status report.

4. The method according to claim 1, wherein the preconfigured uplink resource is a grant-free uplink resource, and the grant-free uplink resource is a shared uplink resource allocated for the mobile device in the power saving state.

5. The method according to claim 1, further comprising:
    when the controller prepares to send downlink data to the mobile device when the mobile device is in the power saving state, receiving, by the mobile device, a downlink instruction message from the controller using a preconfigured downlink resource, wherein the downlink instruction message instructs the mobile device to enter the activated state;
    sending, by the mobile device, a response message for the downlink instruction message to the controller, wherein the response message indicates that the mobile device has entered the activated state; and
    receiving, by the mobile device in the activated state, the downlink data from the controller.

6. The method according to claim 5, further comprising:
    receiving, by the mobile device, a portion of the downlink data from the controller using the preconfigured downlink resource, wherein the downlink data comprises the portion of the downlink data and remaining data of the downlink data; and
    wherein receiving, by the mobile device in the activated state, the downlink data from the controller comprises:

receiving, by the mobile device in the activated state from the controller, the remaining data of the downlink data.

7. The method according to claim 5, wherein:
the downlink instruction message is a paging message, and the preconfigured downlink resource is used to bear the paging message; or
the downlink instruction message is a notification message, and the preconfigured downlink resource is used to bear the notification message.

8. The method according to claim 5, wherein the preconfigured downlink resource is a grant-free downlink resource, and the grant-free downlink resource is a shared downlink resource allocated for the mobile device in the power saving state.

9. A mobile device, comprising:
a transceiver, configured to:
receive, from a controller, an instruction message for entering a power saving state, the mobile device being in a hyper cell, wherein:
the instruction message comprises a configuration parameter indicating a preconfigured uplink resource to be used by the mobile device while the mobile device is in the power saving state;
the hyper cell comprises a plurality of transmission points (TPs);
the mobile device is identified in the hyper cell using a dedicated user equipment identity (DUI); and
the mobile device reserves the DUI when the mobile device is in the power saving state;
a processor, configured to:
determine that there is uplink data to be sent to the controller, wherein the mobile device is in the power saving state when the mobile device determines that there is to-be-sent uplink data; and
the transceiver is further configured to:
after the processor determines that there is the uplink data to be sent to the controller, send an uplink instruction message to the controller based on the DUI by using the preconfigured uplink resource, wherein the controller is a radio access network controller or a core network controller, wherein the uplink instruction message indicates the mobile device will subsequently enter an activated state, wherein the mobile device, when in the power saving state, sends a tracking signal continuously in the hyper cell based on the DUI, and the mobile device sends the uplink instruction message using the tracking signal, and wherein the tracking signal sent by the mobile device comprises a common tracking signal and a dedicated tracking signal, the mobile device sends the uplink instruction message by sending the dedicated tracking signal, and a time-frequency resource or a code resource allocated for sending the dedicated tracking signal is different from a time-frequency resource or a code resource allocated for sending the common tracking signal; and
send the uplink data to the controller after the mobile device enters the activated state.

10. The mobile device according to claim 9, wherein the transceiver is further configured to:
send a portion of the uplink data by using the preconfigured uplink resource, wherein the uplink data comprises the portion of the uplink data and remaining data of the uplink data; and
wherein the transceiver is configured to:
after the mobile device enters the activated state, send the remaining data of the uplink data to the controller.

11. The mobile device according to claim 9, wherein the uplink instruction message is a scheduling request message or a buffer status report.

12. The mobile device according to claim 9, wherein the preconfigured uplink resource is a grant-free uplink resource, and the grant-free uplink resource is a shared uplink resource allocated for the mobile device in the power saving state.

13. The mobile device according to claim 9, wherein the transceiver is further configured to:
when the controller prepares to send downlink data to the mobile device in the power saving state, receive a downlink instruction message from the controller using a preconfigured downlink resource, wherein the downlink instruction message instructs the mobile device to enter the activated state;
send a response message for the downlink instruction message to the controller, wherein the response message indicates that the mobile device has entered the activated state; and
receive the downlink data from the controller after the mobile device enters the activated state.

14. The mobile device according to claim 13, wherein the transceiver is further configured to:
receive a portion of the downlink data from the controller using the preconfigured downlink resource, wherein the downlink data comprises the portion of the downlink data and remaining data of the downlink data; and
wherein the transceiver is configured to:
after the mobile device enters the activated state, receive, from the controller, the remaining data of the downlink data.

15. The mobile device according to claim 13, wherein the downlink instruction message is a paging message, and the preconfigured downlink resource is used to bear the paging message; or
the downlink instruction message is a notification message, and the preconfigured downlink resource is used to bear the notification message.

16. The mobile device according to claim 13, wherein the preconfigured downlink resource is a grant-free downlink resource, and the grant-free downlink resource is a shared downlink resource allocated for the mobile device in the power saving state.

* * * * *